US009118224B2

(12) United States Patent
Okimitsu

(10) Patent No.: US 9,118,224 B2
(45) Date of Patent: Aug. 25, 2015

(54) STATOR FOR ROTARY ELECTRIC MACHINE

(71) Applicant: HONDA MOTOR CO,. LTD., Tokyo (JP)

(72) Inventor: Takeomi Okimitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 13/759,305

(22) Filed: Feb. 5, 2013

(65) Prior Publication Data

US 2013/0200743 A1    Aug. 8, 2013

(30) Foreign Application Priority Data

Feb. 8, 2012 (JP) .................................. 2012-025115

(51) Int. Cl.
*H02K 3/12*    (2006.01)
(52) U.S. Cl.
CPC ....................................... *H02K 3/12* (2013.01)
(58) Field of Classification Search
CPC .................................. H02K 3/04; H02K 3/12
USPC ............................ 310/201, 260, 270, 71, 208
See application file for complete search history.

(56) References Cited

U.S. PATENT DOCUMENTS

| 6,271,608 | B1 * | 8/2001 | Haydock et al. ................. 310/71 |
| 6,297,572 | B1 * | 10/2001 | Sunaga et al. ................ 310/68 R |
| 7,723,879 | B2 * | 5/2010 | Fujii et al. ......................... 310/71 |
| 7,969,052 | B2 * | 6/2011 | Ichise et al. ...................... 310/71 |
| 8,736,127 | B2 * | 5/2014 | Schlote ........................... 310/184 |
| 2004/0135457 | A1 * | 7/2004 | Holzheu et al. ............... 310/179 |
| 2005/0189833 | A1 * | 9/2005 | Liao ............................... 310/179 |
| 2008/0136274 | A1 * | 6/2008 | Fujii et al. ....................... 310/71 |
| 2009/0230808 | A1 * | 9/2009 | Tatebe .......................... 310/201 |
| 2012/0104885 | A1 * | 5/2012 | Cominetti et al. .............. 310/71 |

FOREIGN PATENT DOCUMENTS

JP        2008-148479 A        6/2008

* cited by examiner

*Primary Examiner* — Naishadh Desai
(74) *Attorney, Agent, or Firm* — Squire Patton Boggs (US) LLP

(57) ABSTRACT

The manufacturing cost of a stator for a rotary electric machine can be reduced, and the volume of coil end portions can be reduced to enable downsizing. A stator for a rotary electric machine includes: a cylindrical stator core with plural slots formed at an inner circumferential surface; a plurality of coil segments received by the slots; a plurality of first coil end plates electrically connected with the coil segments on either one of end surfaces of the stator core; and a plurality of second coil end plates electrically connected with the coil segments on the other end surface of the stator core. The plate portion of at least one of the plurality of the first coil end plates is formed longer than the plate portions of the other first coil end plates and has a stepped portion.

8 Claims, 20 Drawing Sheets

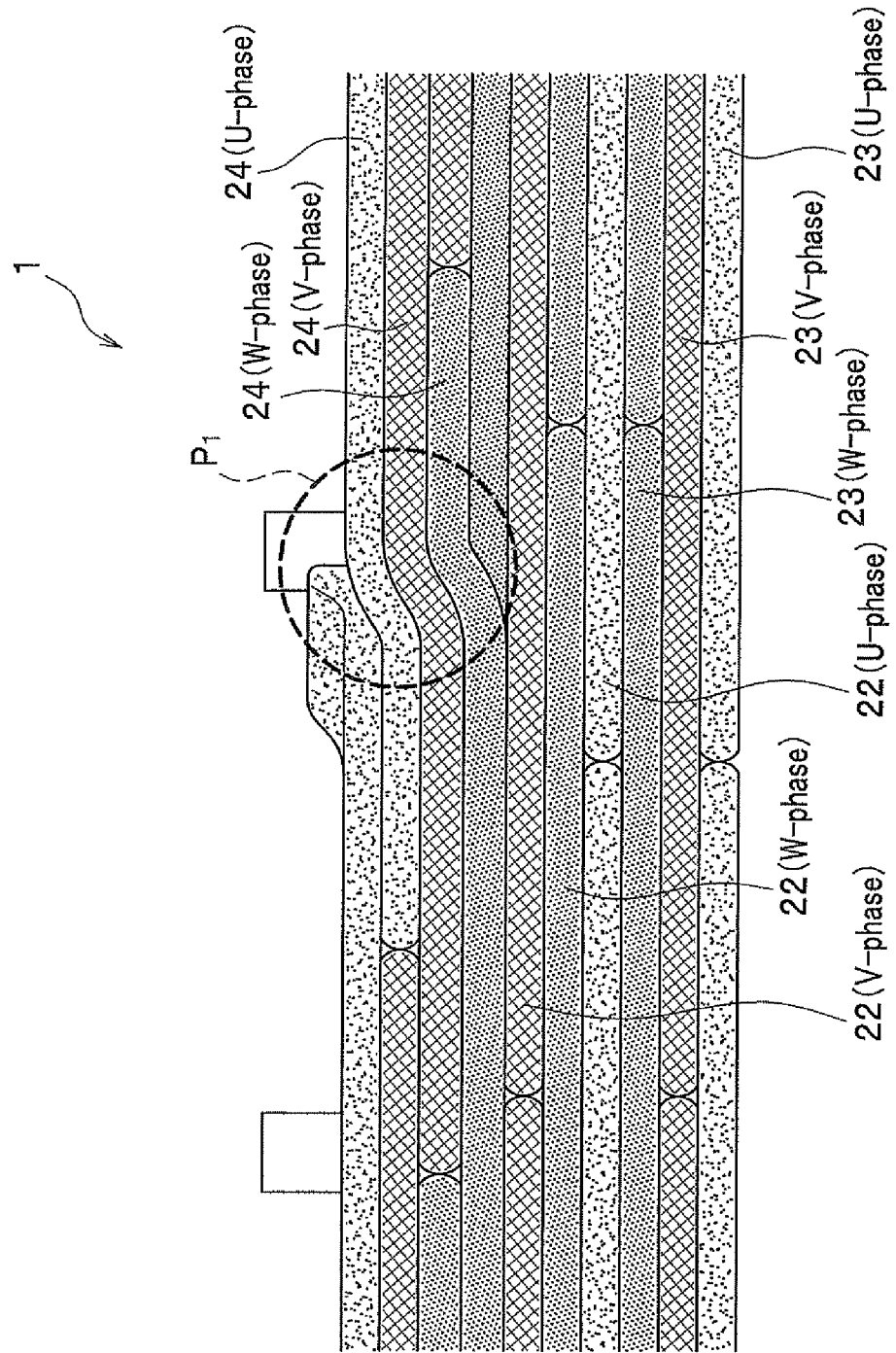

STATOR FOR ROTARY ELECTRIC MACHINE

CROSS REFERENCE TO RELATED APPLICATION

This application claims the foreign priority benefit under Title 35, United States Code, §119(a)-(d) of Japanese Patent Application No. 2012-025115, filed on Feb. 8, 2012 in the Japan Patent Office, the disclosure of which is herein incorporated by reference in its entirety.

BACKGROUND OF THE INVENTION

1. Field of the Invention

The present invention relates to a stator used for a rotary electric machine including an electric motor and a generator.

2. Description of the Related Art

Conventionally, various structures have been presented for a stator, including a stator core, a stator coil for a rotary electric machine. For example, a stator is disclosed, in Patent Document 1 (Japanese Patent Application Laid-open No. 2008-148479 A, refer to FIG. 4), that includes s stator core having teeth, U-shaped leads inserted in the teeth, and bus bars connected with the U-shaped leads.

However, the stator disclosed by Patent Document 1 has a problem in that the cost is high because it is necessary to bend leads and forge leads in order to form the above-described U-shaped leads. Further, the bent portions of the U-shaped leads of the stator presented by Patent Document 1 are extending along the rotation axis direction of a rotary electric machine, which causes a problem that the volume of the coil end portions is large and downsizing is not easy.

SUMMARY OF THE INVENTION

The present invention has been developed addressing such problems, and an object of the invention is to provide a stator for a rotary electric machine, wherein reduction in the manufacturing cost and downsizing by reducing the volume of coil end portions can be attained for the stator.

A first aspect of the present invention provides a stator for a rotary electric machine, comprising:

a stator core in a sleeve shape with a plurality of slots formed at an inner circumferential surface thereof;

a plurality of coil segments received by the slots;

a plurality of first coil end plates electrically connected with the coil segments on either one of end surfaces of the stator core; and a plurality of second coil end plates electrically connected with the coil segments on the other end surface of the stator core, wherein each of the coil segments comprises connecting end portions protruding respectively from the one and the other end surfaces of the stator core, wherein each of the first coil end plates comprises:

a plate portion in a flat plate shape extended along a circumferential direction of the stator core; and a pair of extended portions respectively extended along a radial direction of the stator core from one end side of the plate portion such that the connecting end portions of the corresponding coil segments are connected to the pair of extended portions, wherein the plurality of first coil end plates and the plurality of second coil end plates are disposed being laminated on the corresponding end surfaces of the stator core, and wherein the plate portion of at least one of the plurality of first coil end plates is formed longer along the circumferential direction of the stator core than the plate portions of the other first coil end plates and has a stepped portion.

For a stator for a rotary electric machine, the stator having such a structure, by receiving a plurality of coil segments by the slots of a stator core and electrically connecting the end portions of the plurality of coil segments with each other through the first coil end plates and the second coil end plates in a flat plate shape, it is possible to easily form a coil loop around the rotation axis of the rotary electric machine, without extending the coil end portions along the rotation axis.

Further, for example, in a case of forming coil turns, which are annular current paths, with the coil segments, the first coil end plats, and the second coil end plates, it is possible to dispose the extended portions of the plurality of first coil end plates such that the extended portions intersect with each other at the positions of the stepped portions in order to form a coil loop by connecting plural coil turns. Accordingly, for the stator for a rotary electric machine, in forming a coil loop, it is possible to reduce the space for disposing the first coil end plates to the minimum, and space saving can be attained.

A second aspect of the present invention provides the stator according to the first aspect, wherein the coil segments are received by respective two of the slots of the stator core and the connecting end portions of these coil segments are connected with a first coil end plate on the one end surface of the stator core and connected with a second coil end plate on the other end surface of the stator core to form a coil turn being an annular current path, and wherein a plurality of coil turns are formed along the circumferential direction of the stator core, corresponding to a number of combinations of coil segments received in two different slots of the stator core, the corresponding first coil end plate, and the corresponding second coil end plate to form a lap-wound coil loop.

For a stator for a rotary electric machine, the stator having such a structure, a plurality of coil segments are received by the slots of a stator core; the end portions of the plurality of coil segments are electrically connected with each other through coil end plates in a flat plate shape; a coil pattern is formed in such a manner; and a plurality of coil patterns are formed along the circumferential direction of the stator core. Thus, it is possible to easily form a lap-wound coil loop.

A third aspect of the present invention provides the stator according to the second aspect, wherein each of the first coil end plates is disposed such that an end portion side thereof overlaps with the first coil end plate that forms a neighboring coil turn, the corresponding extended portions of the coil end plates intersecting with each other, and wherein the stepped portion is formed at a part of the overlapping of the end portion side.

For a stator for a rotary electric machine, the stator having such a structure, by disposing the extended portions of the plural first coil end plates such that the extended portions intersect with each other at the positions of the stepped portions, it is possible to connect a plurality of coil turns while reducing height of the laminated first coil end plates.

A fourth aspect of the present invention provides the stator according to the first aspect, wherein the at least one first coil end plate having the stepped portion is disposed on an uppermost layer of the plurality of first coil end plates laminated on the one end surface of the stator core.

For a stator for a rotary electric machine, the stator having such a structure, in laminating the first coil end plates on the one end surface of the stator core, the first coil end plate/plates having the stepped portion is/are disposed uppermost, and no first coil end plate without the stepped portion is disposed on the first coil end plate/plates with the stepped portion.

Accordingly, it is possible to prevent generation of a wasteful space (gap) due to the step at the stepped portion.

A fifth aspect of the present invention provides the stator according to the first aspect, wherein an elastic member is arranged between the plurality of first coil end plates disposed in lamination on the one end surface of the stator core.

For a stator for a rotary electric machine, the stator having such a structure, for example, even in case that coil segment stretch by heat or vibrate during operation, as effects of these can be reduced by the elastic force of elastic members. Thus, joining state between coil segments, the first coil end plates, and the second coil end plates can be stabilized.

A sixth aspect of the present invention provides the stator according to the first aspect, wherein virtual extension lines along respective longitudinal directions of the paired extended portions intersect with each other on an inner diameter side of the stator core.

For a stator for a rotary electric machine, the stator having such a structure, it is possible to dispose the first coil end plates and the second coil end plates such that pairs of extended portions do not interfere with each other on the end surface of the stator core.

For a stator, for a rotary electric machine, according to the present invention, a stator coil is formed without using U-shaped leads, which requires bending and forging in manufacturing, and the manufacturing cost can thereby be reduced. For the stator for a rotary electric machine, as the first coil end plates and the second coil end plates in a flat plate shape are disposed in lamination as coil end members respectively on one end surface and on the other end surface of the stator core. Accordingly, the heights of the coil end portions on the end surfaces of the stator core can be reduced to the minimum. Accordingly, the volume of the coil end portions can be reduced while satisfactory lap winding is attained, and downsizing of a whole device can thereby be realized.

BRIEF DESCRIPTION OF THE DRAWINGS

FIGS. 5A and 5B show the structure of a first coil end plate having a stepped portion, the first coil end plate forming a part of the stator coil of the stator, for a rotary electric machine, in the embodiment according to the invention, wherein FIG. 5A is a plan view of the first coil end plate having the stepped portion and FIG. 5B is a side view of the first coil end plate having the stepped portion;

FIG. 6 shows an example of disposing first coil end plates that form a part of the stator coil of the stator, for a rotary electric machine, in the embodiment according to the invention and is an enlarged view of part A in FIG. 1;

FIG. 11A and FIG. 11B show the structures of second coil end plates which form a part of the stator coil of the stator, for a rotary electric machine, in the embodiment according to the invention, wherein FIG. 11A is a perspective view showing a state that the plate portions of three kinds of coil end plates having different shapes are disposed to be laminated along the rotation axis direction of the rotary electrical machine, and FIG. 11B is a plan view showing a state that the plate portions of the three kinds of second coil end plates with different shapes are laminated;

FIGS. 13A and 13B show a part of the stator coil of the stator, for a rotary electric machine, in the embodiment according to the invention, wherein FIG. 13A is a perspective view showing the structure of the left-right reverse coil end plate, and FIG. 13B is a perspective view showing the structure of the midpoint-short-circuit coil end plate;

FIGS. 17A and 17B are diagrams for illustration of the coil loop of the stator, for a rotary electric machine, in the embodiment according to the invention, wherein FIG. 17A is an enlarged view of part D in FIG. 16, and FIG. 17B is a perspective view showing members corresponding to part D in FIG. 16;

FIGS. 18A and 18B are diagrams for illustration of the coil loop of the stator, for a rotary electric machine, in the embodiment according to the invention, wherein FIG. 18A is an enlarged view of part E in FIG. 16, and FIG. 18B is a perspective view showing members corresponding to part E in FIG. 16;

FIGS. 19A and 19B are diagrams for illustration of the coil loop of the stator, for a rotary electric machine, in the embodiment according to the invention, wherein FIG. 19A is an enlarged view of part F in FIG. 16, and FIG. 19B is a perspective view showing members corresponding to part F in FIG. 16; and FIGS. 20A and 20B are diagrams for illustration of the stator, for a rotary electric machine, in another embodiment, wherein FIG. 20A shows a state of connection between a coil end plate and a coil segment for the stator, for a rotary electric machine, in the above-described embodiment according to the present invention, and FIG. 20 B shows a state of connection between a coil end plate and a coil segment of the stator, for a rotary electric machine, according to another embodiment.

DETAILED DESCRIPTION OF THE PREFERRED EMBODIMENT

A preferred embodiment of a stator according to the present invention (hereinafter, referred to merely as stator) for a rotary electric machine will be described below, referring to FIGS. 1 to 13. Dimensions and scales of structures shown in respective figures may be exaggerated for the convenience of description.

Figure 1:
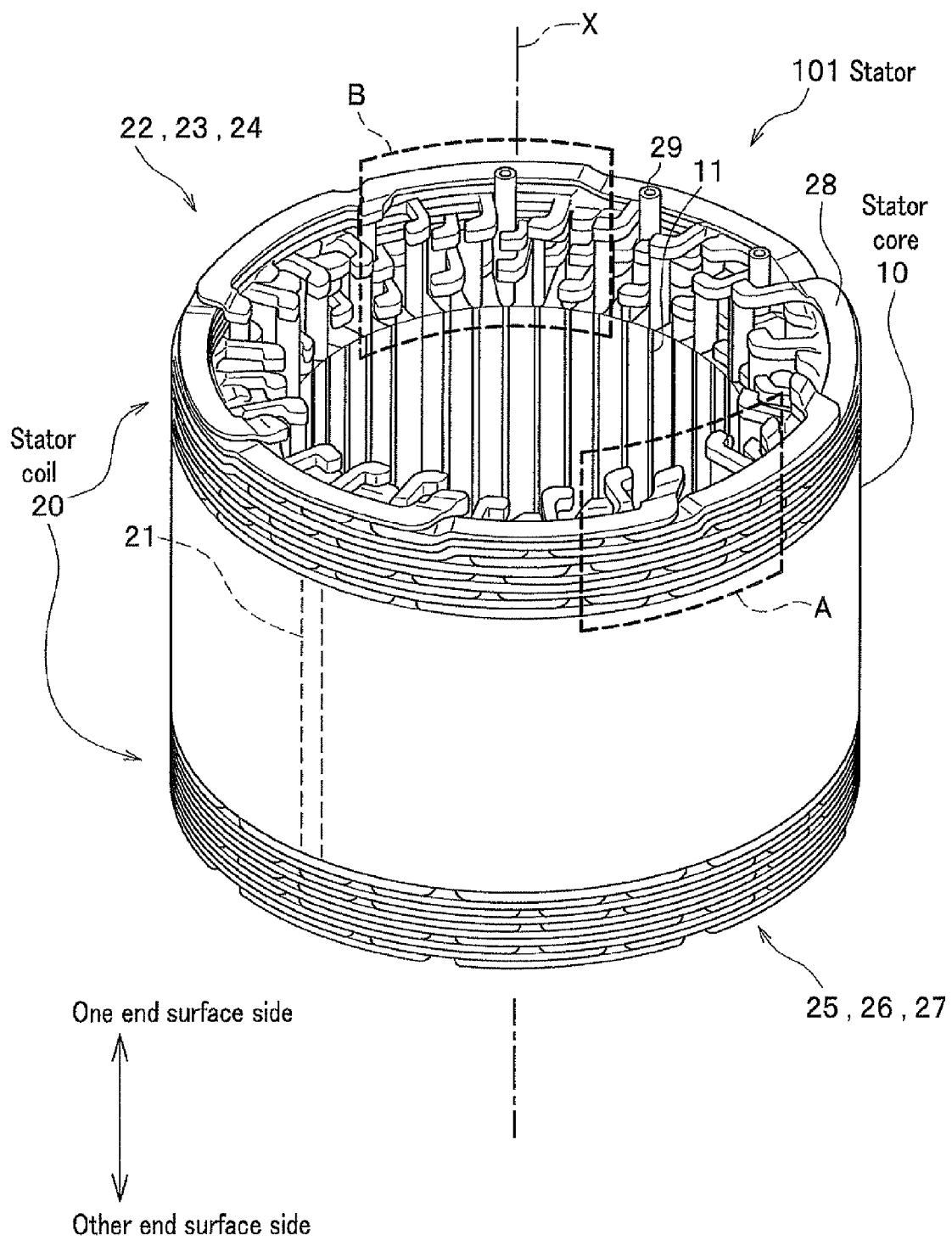
FIG. 1 is a perspective view showing the whole structure of a stator, for a rotary electric machine, in an embodiment according to the present invention.

A stator 101 is one for a rotary electric machine for rotational motion by conversion of electrical energy supplied from outside into mechanical energy. Electrical energy is input to the stator 101 from the outside, and the stator 101 generates a magnetic field for rotational motion of a rotor provided with permanent magnets. The stator 101 can be used, for example, as the stator of an induction motor, synchronous motor, or the like. As shown in FIG. 1, the stator 101 includes a stator core 10 and stator coils 20.

Figure 2:
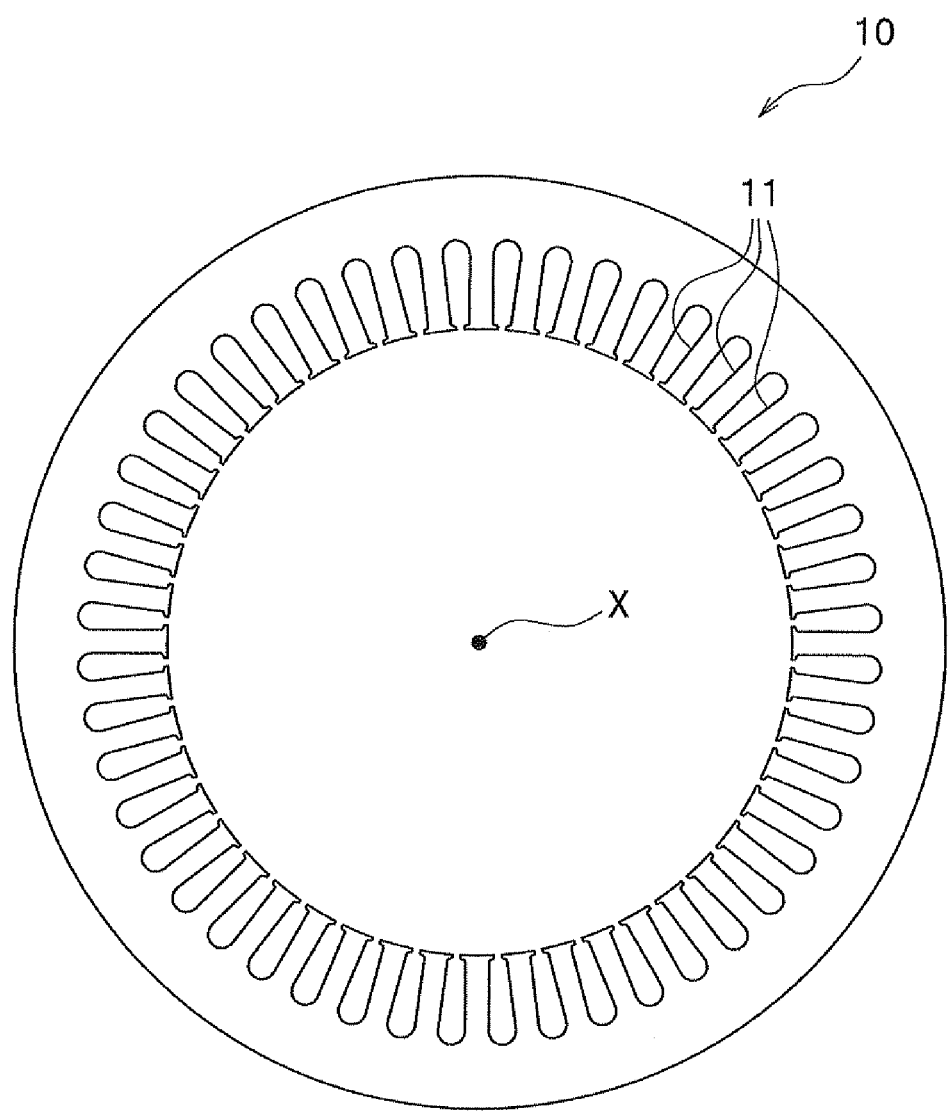
FIG. 2 is a plan view showing the structure of the stator core of the stator, for a rotary electric machine, in the embodiment according to the invention.

The stator core 10 is, as shown in FIG. 1, a core member to which the stator coils 20 are attached. The stator core 10 is, as shown in FIG. 2, formed in a circular sleeve shape and a rotor, not shown, is arranged inside the cylinder. The stator core 10 can be formed, for example, by lamination of thin electromagnetic steel plates in a circular annular shape along the rotation axis X direction of the rotary electric machine. As shown in FIG. 2, a plurality of slots (recessions) 11 are formed at uniform intervals on the inner circumferential surface of the stator core 10.

As shown in FIG. 1, the slots 11 are arranged to receive coil segments. The slots 11 are, as shown in FIG. 1, formed linearly along the rotation axis X direction of the rotary electric machine. In a plan view, as shown in FIG. 2, the slots 11 are formed in the same size (the same cross-sectional area, in other words, the same largeness of cross-section) with respect to the rotation axis X direction such as to increase in the width as going toward the outer diameter side of the stator core 10. Thus, the stator 101 in the present embodiment can surely hold coil segments 21 received in the slots 11. Incidentally, the slots 11 may also be formed with a width that is constant or uniform along the radial direction of the stator core 10.

Herein, as shown in FIG. 2, the slots 11 are formed in a number of 48 and in one row with respect to the rotation axis X direction. However, the number of the slots 11 is not particularly limited, and can be changed, as appropriate, corresponding to the number of coil turns (the number of turns of a coil loop) formed along the circumferential direction of the stator core 10 and the number of phases of currents supplied from outside. Coil turns formed on the stator 101 will be described later in detail (refer to FIG. 14 described later).

Figure 3:
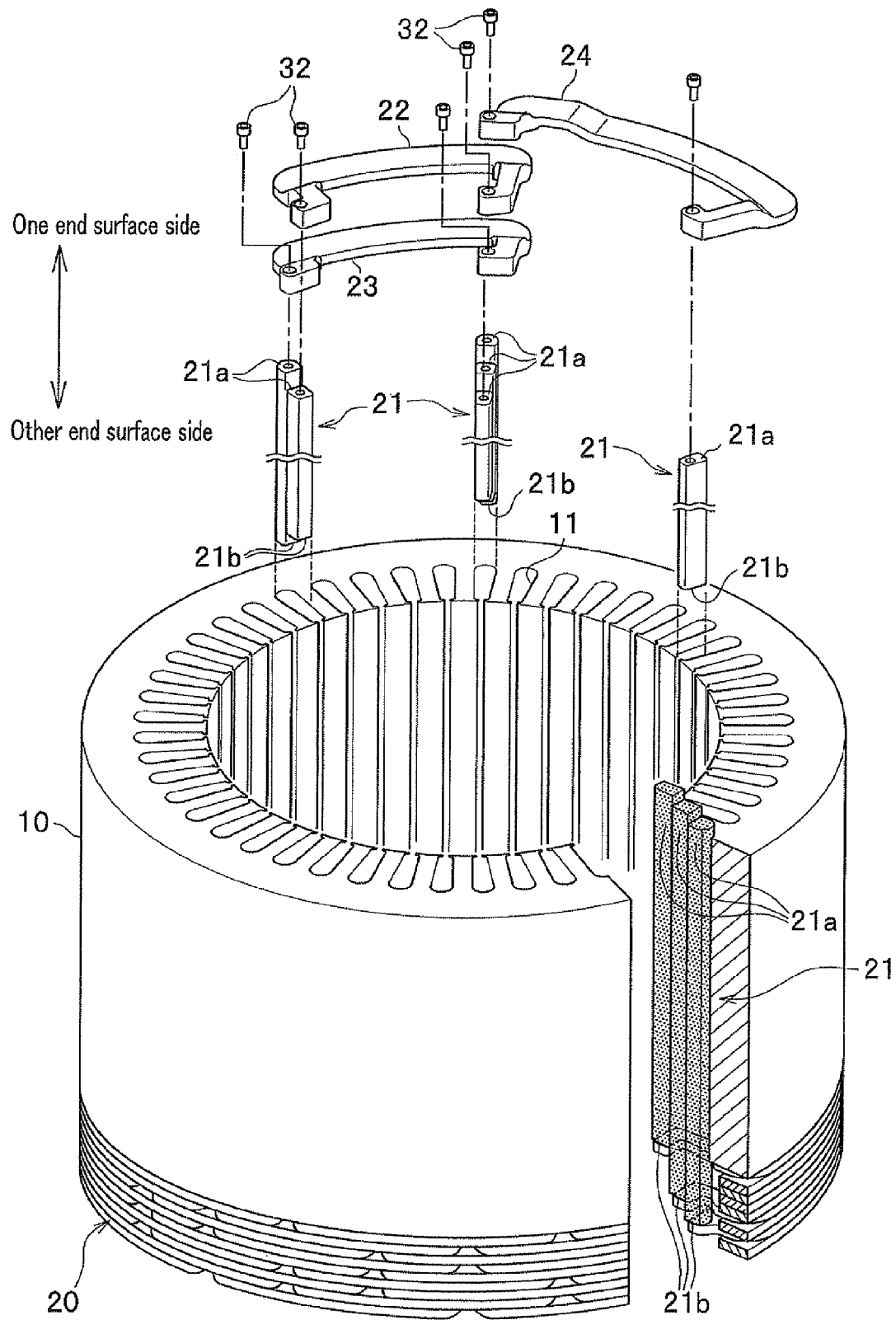
FIG. 3 is a diagram showing a state of connection between the coil segments, the first coil end plates, and the second end plates of the stator, for a rotary electric machine, in the embodiment according to the invention.

As shown in FIG. 3, in the slots 11, the coil segments 21 are inserted from one end surface of the stator core 10. The coil segments 21 received by the slots 11 are, as shown in FIG. 3, connected with the first coil end plates, 22, 23, 24 on the one end surface side of the stator core 10, and electrically connected with the second coil end plates 25, 26, 27 on the other end surface side of the stator core 10. In FIG. 3, the coil segments 21 received by the slots 11 and the first coil end plates 22, 23, 24 are shown only partially by extraction.

Stator coils 20 are magnetically excited by electrical energy that is input from the outside to generate a rotational magnetic field. Herein, currents in three phases, namely, U-phase, V-phase, and W-phase are supplied from the outside to the stator coil 20. Herein, as shown in FIG. 1, a stator coil 20 is not an ordinary winding wire but is constructed with coil segments in pieces of plural kinds and coil end plates in plural kinds.

Figure 12:
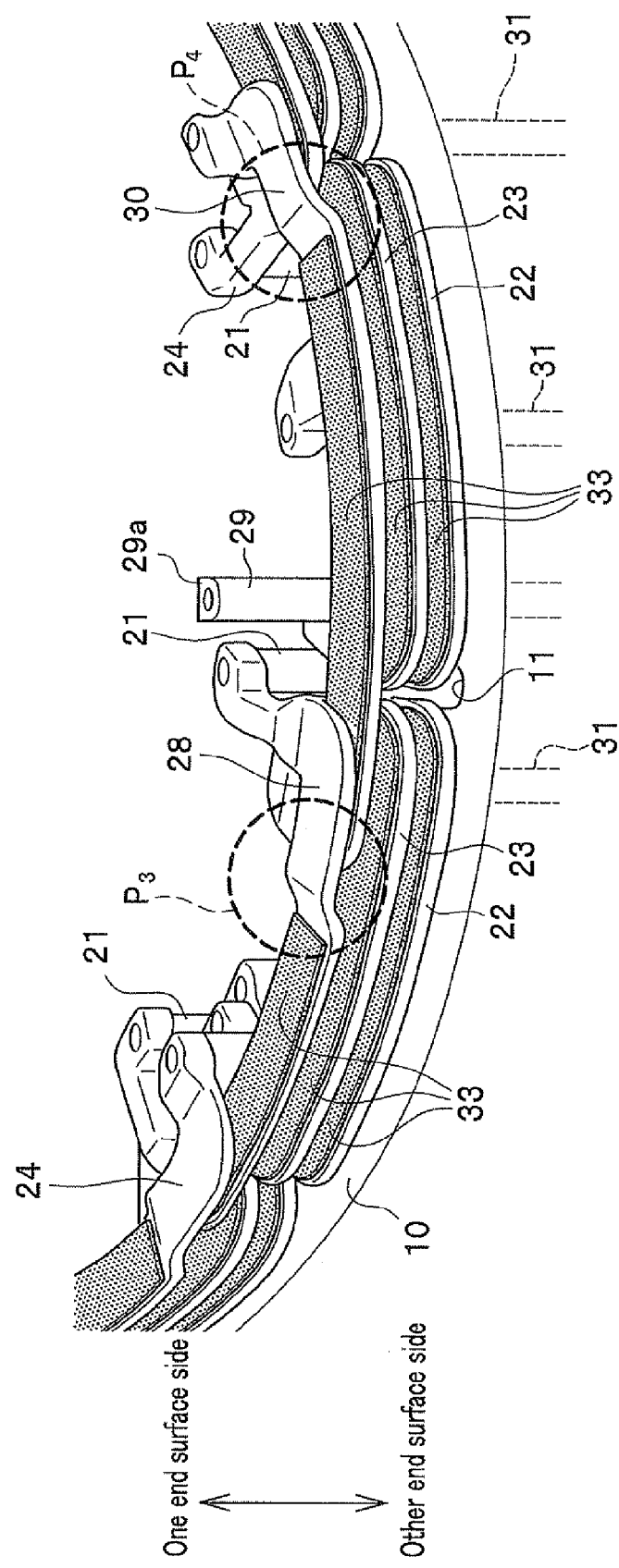
FIG. 12 shows an example of disposing a left-right reverse coil end plate, a power supply coil segment, a midpoint-short-circuit coil end plate, and a midpoint connection coil segment, which form a part of the stator coil of the stator, for a rotary electric machine, in the embodiment according to the invention and shows a part of part B in FIG. 1.

The coil segments in the plural kinds include, as shown concretely in FIG. 1, coil segments 21, power supply coil segments 29, and midpoint connection segments 31 (see FIG. 12). The coil end plates in the plural kinds include, as shown concretely in FIG. 1, first coil end plates 22, 23, 24, second coil end plates 25, 26, 27, left-right reverse coil end plates 28, and a midpoint-short-circuit coil end plate 30 (see FIG. 12). For the stator coil 20, as shown in FIG. 1, one electrical a loop is formed in such a manner that such coil segments in plural kinds and coil end plates in plural kinds are electrically connected on the end surface sides of the stator core 10. A coil loop formed on the stator 101 will be described later in detail (see FIG. 16 described later).

The coil segments in plural kinds (the coil segments 21, the power supply coil segments 29, and the midpoint connection segment 31) and the coil end plates in plural kinds (the first coil end plates 22, 23, 24, the second coil end plates 25, 26, 27, the left-right reverse coil end plates 28, and the midpoint-short-circuit coil end plate 30) of the stator coil 20 are formed with the same cross-sectional area (the same size of cross-section) perpendicular to the direction of current flow. That is, for the stator 101 in the present embodiment, the coil segments and the coil end plates constructing the stator coils 20 are designed such as to have the same cross-sectional area although the cross-sectional shapes with respect to the direction perpendicular to the direction of current flow are different. Thus, for the stator 101 in the present embodiment, the electrical resistance of the stator coils 20 can be made uniform, and it is thereby possible to reduce generation of local heat, stabilize current flow, and stably form a rotational magnetic field.

Further, though not shown, coil segments in plural kinds (the coil segments 21, the power supply coil segments 29, and the midpoint connection coil segments 31) and the coil end plates in plural kinds (the first coil end plates 22, 23, 24, the second coil end plates 25, 26, 27, the left-right reverse coil end plates 28, and the midpoint-short-circuit coil end plate 30) of the stator coils 20 have been subjected to insulation processing, for example, by resin impregnation.

Structures of Coil Segments 21

The coil segments 21 constructing a part of a stator coil 20 will be described below. In the description below, in a case of describing inclusively or abstractly the coil segments 21, the first coil end plates 22, 23, 24, and the second coil end plates 25, 26, 27, they may be described respectively as 'coil segment', 'coil end plate', 'first coil end plate', 'second coil end plate', or the like, reference symbols being omitted. Further, in the description below, in describing an element common to the coil segments 21 (for example a connecting end portion), an element common to the first coil end plates 22, 23, 24 and an element common the second coil end plates 25, 26, 27 (for example, a pair of extended portions), and the like, symbols for these common elements may be omitted to avoid reluctant description.

As shown in FIG. 1, the coil segments (coil bars) 21 are members of the stator coils 20, and are arranged to flow currents, which are supplied from outside, in the rotation axis X direction of the rotary electric machine. The coil segments 21 are conductive members in a bar shape of, for example, copper, copper alloy, aluminum, aluminum alloy, or the like, and are linearly formed, as shown in FIG. 3. However, the material for coil segments 21 is not particularly limited as long as the material is excellent in conductivity and formability.

As shown in FIG. 3, a coil segment 21 has a connecting end portion 21a protruding from the one end surface side and a connecting end portion 21b protruding from the other one end surface side in a state the coil segment 21 is received by a slot 11 of the stator core 10. That is, the total length of a coil segment 21 is, as shown in FIG. 3, formed longer than the total length of the stator core 10 by the lengths of 21a, 21b. The connecting end portion 21a is connected with the extended portions of first coil end plates 22, 23, 24 (see FIGS. 4 and 5). The connecting end portion 21b is connected with the extended portions of second coil end plates 25, 26, 27 (see FIG. 11).

The connecting end portions 21a, 21b are provided with hole portions, not shown, with a certain depth in to which, for example, fastening members 32 (see FIG. 3) are inserted when the coil segment 21 and the respective coil end plates are connected. However, hole portions may be not formed in a case of joining the coil segment 21 and the respective coil end plates by a different method, such as welding or the like.

Herein, as described later, for the stator 101 in the present embodiment, the first coil end plates 22, 23, 24 are laminated on the one end surface of the stator core 10 and the second coil end plates 25, 26, 27 are laminated on the other end surface side of the stator core 10, both in a number obtained by multiplying the number of coil turns (the number of turns of a coil loop) counted along the radial direction of the stator core 10 and the number of phases of currents supplied from outside (see FIG. 8 described later).

In this case, the number of lamination layers of the first coil end plates 22, 23, 24 and the second coil end plates 25, 26, 27 increases corresponding to the number of phases of current, while the distance between the first coil end plates 22, 23, 24 and the second coil end plates 25, 26, 27 becomes larger along the rotation axis X of the rotary electric machine. Accordingly, for the stator 101 in the present embodiment, the coil segments 21 are prepared with different lengths, corresponding to the number of phases of current. In such a manner, for the stator 101, even in a case that, corresponding to the number of phases of current supplied from the outside, the number of lamination layers of the first coil end plates 22, 23, 24 and the second coil end plates 25. 26. 27 laminated on the end surfaces of the stator core 10 increases, and the distances between the first coil end plates 22, 23, 24 and the second coil end plates 25, 26, 27 are expanded with the stator core 10 therebetween, it is possible to adjust the lengths of the coil segments 21, corresponding to the expanded distances. Thus, for the stator 101, it is possible to easily connect the first coil end plates 22, 23, 24, the second coil end plates 25, 26, 27, and the coil segments 21 disposed on respective layers, and improve easiness in assembling.

A coil turn, described above, refers to an annular current path formed in the following manner. That is, coil segments 21 are received by two slots 11 of the stator core 10; the connecting end portions 21a, 21b of these coil segments 21 are connected respectively with first coil end plates 22, 23, 24 on one end surface side (in FIG. 1, the one end surface side) of the stator core 10 and with second coil end plates 25, 26, 27 on the other end surface side (in FIG. 1, the other end surface side) of the stator core 10 (see FIG. 14 described later). Such coil turns are formed in a plural number with respect to the radial direction of the stator core 10, corresponding to the number of combinations of coil segments 21 inserted in the same slot 11 of the stator core 10 and corresponding first coil end plates 22, 23, 24 and second coil end plates 25, 26, 27 (see FIG. 14 described later). Further, coil turns are formed in a plural number with respect to the circumferential direction of the stator core 10, corresponding to the number of combinations of coil segments 21 inserted in two different slots 11 of the stator core 10 and corresponding first coil end plates 22, 23, 24 and second coil end plates 25, 26, 27, wherein a lap-wound coil loop is thereby formed (see FIG. 16 described later).

A coil loop refers to a current path (a current path around the rotation axis X of the rotary electric machine) that is arranged over the whole stator 101 and is formed by all coil turns in a group formed in the radial direction and the circumferential direction of the stator core 10 (refer to FIG. 16 described later). Such coil loops are arranged in two kinds that are concretely clockwise coil loops and counterclockwise coil loops (refer to FIG. 16 described later).

Structures of First Coil End Plates 22, 23, 24

The first coil end plates 22, 23, 24 forming a part of a stator coil 20 will be described below.

The first coil end plates 22, 23, 24 are the coil end members of the stator coil 20, and are used to transfer currents flowing in a coil segment 21 to a different coil segment 21, on the one end surface side of the stator core 10. The first coil end plates 22, 23, 24 are arranged, for example, by a conductive member in a plate shape made from, for example, copper, copper alloy, aluminum, aluminum alloy, or the like. The material for the first coil end plates 22, 23, 24 is not particularly limited as long as the material is excellent in conductivity and formability.

Figure 4A:
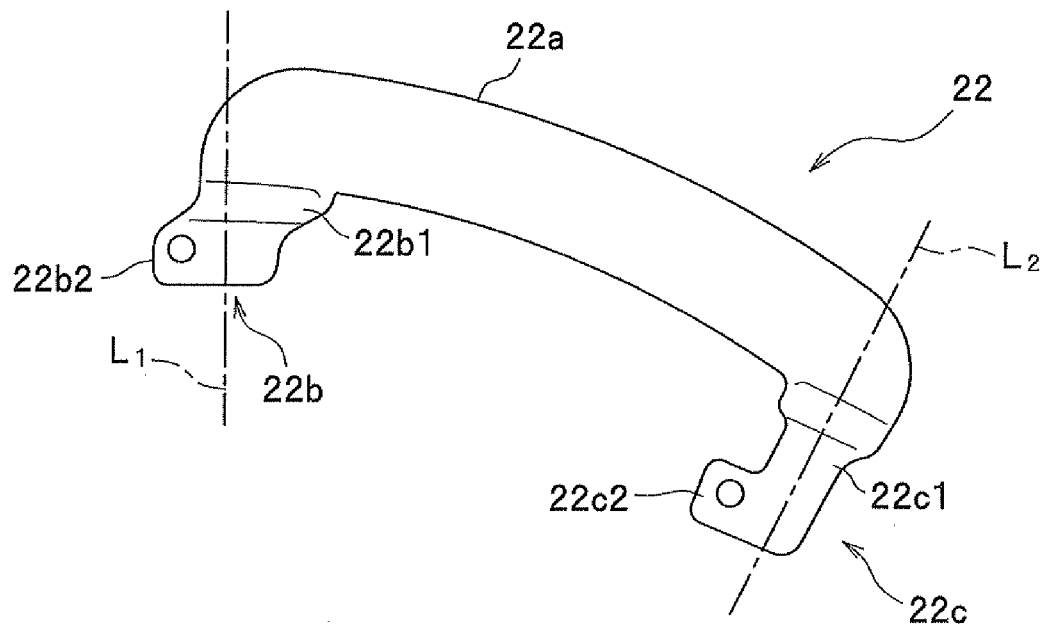
FIGS. 4A and 4B are diagrams showing the structure of first coil end plates that form a part of a stator coil for the stator, for a rotary electric machine, in embodiment according to the invention and are perspective views showing the respective first coil end plates having different shapes.

A first coil end plate 22 has, as shown concretely in FIG. 4A, a plate portion 22a formed in a flat plate shape and a pair of extended portions 22b, 22c extended along the radial direction of the stator core 10 from one end side of the plate portion 22a. This pair of extended portions 22b, 22c are formed, as shown concretely in FIG. 4A, such that the extended portion 22c is longer than the extended portion 22b. Further, more concretely, the extended portions 22b, 22c respectively have, as shown in FIG. 4A, a pair of first extended portions 22b1, 22c1 extended from the one end side of the plate portion 22a (one end side in the radial direction), and a pair of second extended portions 22b2, 22c2 extended respectively from one end side of the pair of first extended portions 22b1, 22c1.

The second extended portions 22b2, 22c2 are, as shown in FIG. 4A, respectively provided with a penetrating hole portion into which, for example, a fastening member 32 (see FIG. 3) is inserted when the first coil end plate 22 and the coil segments 21 are connected. Hole portions may be not formed in case of joining first coil end plate 22 and coil segments 21 by a different method, such as welding.

Figure 4B:
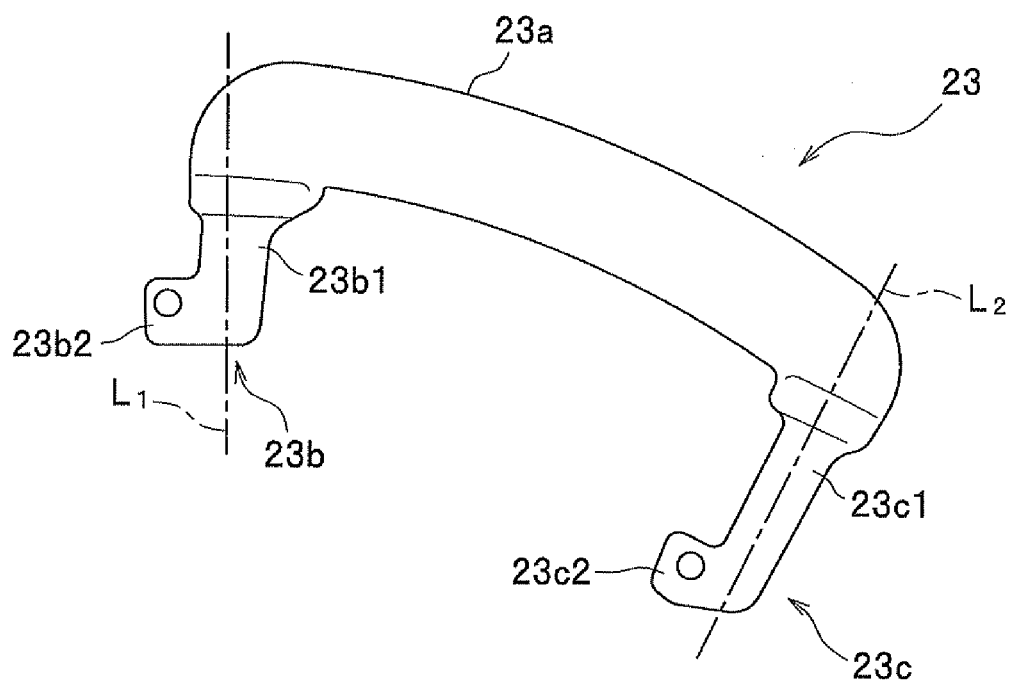

A first coil end plate 23 has, as concretely shown in FIG. 4B, a plate portion 23a in a flat plate shape and a pair of extended portions 23b, 23c extended along the radial direction of the stator core 10 from one end side of the plate portion 23a. The pair of extended portions 23b, 23c are formed, as shown in FIG. 4B, such that the extended portion 23c is longer than the extended portion 23b. Further, the pair of extended portions 23b, 23c are formed, as shown in FIGS. 4A and 4B, such that the extended portion 23b is longer than the extended portion 22b of a first coil end plate 22, and the extended portion 23c is formed longer than the extended portion 22c of the first coil end plate 22. Still further, the extended portions 23b, 23c are more concretely, as shown in FIG. 4B, provided with a pair of first extended portions 23b1. 23c1 extended from the one end side of the plate portion 23a and a pair of second extended portions 23*b*2, 23*c*2 extended from one end side of the pair of first extended portions 23*b*1, 23*c*1.

The second extended portions 23*b*2, 23*c*2 are respectively provided with a penetrating hole portion into which a fastening member 32 (see FIG. 3) is inserted when the first coil end plate 23 and coil segments 21 are connected. However, hole portions may be not formed in case of joining the first coil end plate 23 and the coil segments 21 by a method, such as welding.

Figure 5A:
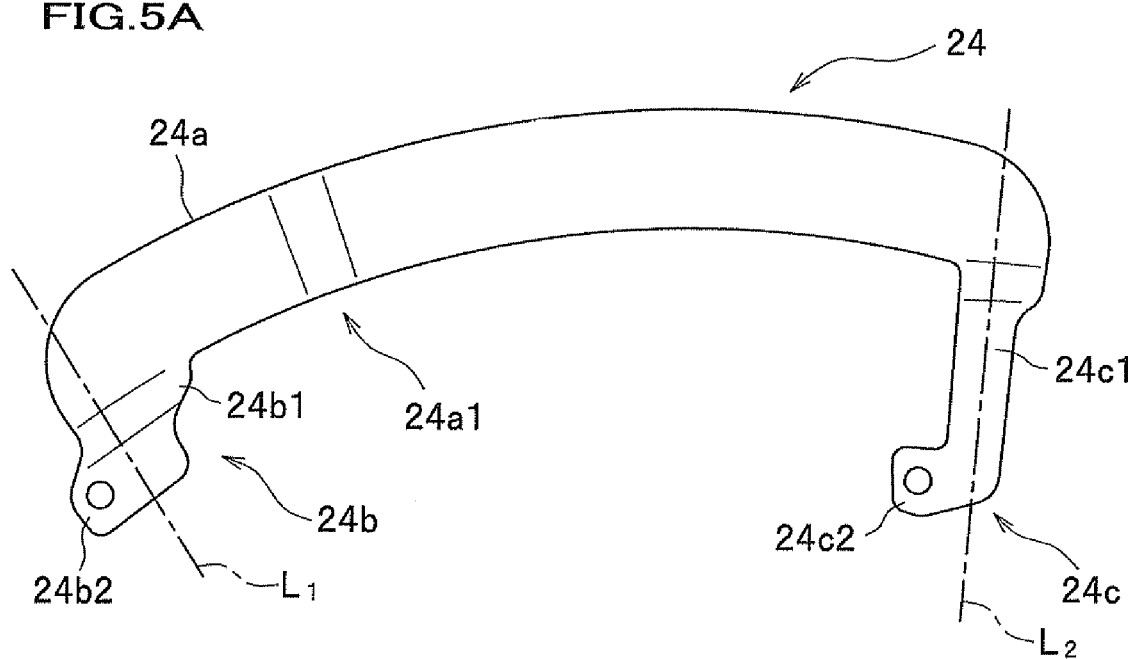
Figure 5B:
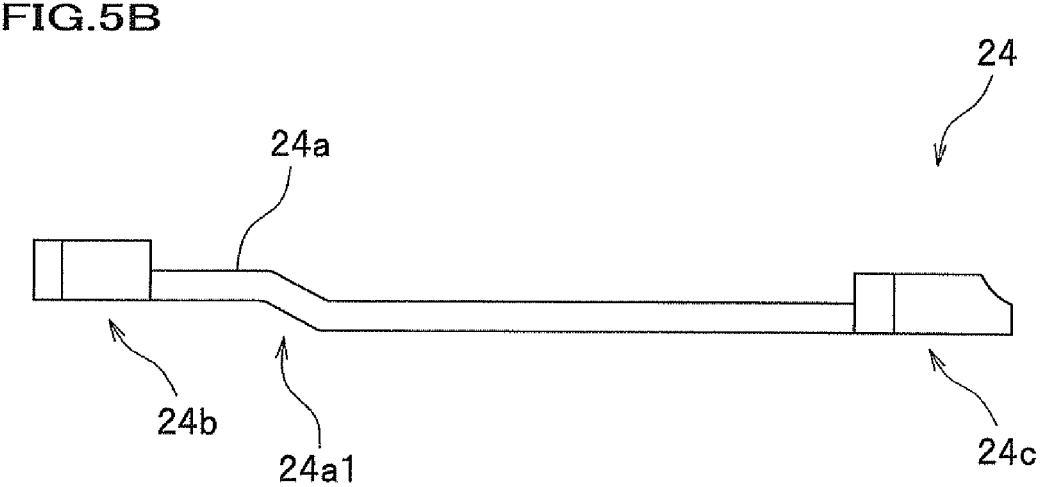

A first coil end plate 24 has, as concretely shown in FIGS. 5A and 5B, a plate portion 24*a* in a flat plate shape and a pair of extended portions 24*b*, 24*c* extended along the radial direction of the stator core 10 from one end side of the plate portion 24*a*. The pair of extended portions 24*b*, 24*c* are formed, as shown in FIG. 5A, such that the extended portion 24*c* is longer than the extended portion 24*b*. Further, the pair of extended portions 24*b*, 24*c* are formed, as shown in FIGS. 4A, 4B and FIG. 5A, such that the extended portion 24*b* is shorter than the extended portion 23*b* of the first coil end plate 23, and the extended portion 24*c* is formed longer than the extended portion 22*c* of the first coil end plate 22. Still further, the extended portions 24*b*, 24*c* are more concretely, as shown in FIG. 5A, provided with a pair of first extended portions 24*b*1. 24*c*1 extended from the one end side of the plate portion 24*a* and a pair of second extended portions 24*b*2, 24*c*2 extended from one end side of the pair of first extended portions 24*b*1, 24*c*1.

The second extended portions 24*b*2, 24*c*2 are respectively provided with a penetrating hole portion into which, for example, a fastening member 32 (see FIG. 3) is inserted when the first coil end plate 24 and coil segments 21 are connected. However, hole portions may be not formed in case of joining the first coil end plate 24 and the coil segments 21 by a method, such as welding.

The plate portion 24*a* is, as shown in FIGS. 5A and 5B, provided with a stepped portion 24*a*1 formed by bending the plate portion 24*a* that is in a flat shape. Coil turns are formed by coil segments 21, first coil end plates 22, 23, 24, and second coil end plates 25, 26, 27, and a coil loop is formed by connecting a plurality of coil turns. In this situation, a stepped portion 24*a*1, as described above, is formed such as to be disposed, as shown at part P$_1$ in FIG. 6, at a cross-point of intersection with the extended portion of another first coil end plate 24. Further, as shown in FIG. 6, stepped portions 24*a*1 are formed by bending such so as to adjust the thicknesses of a plurality of first coil end plates 24 so that a stepped portion 24*a*1 and the stepped portion 24*a*1 of another first coil end plate 24 can be disposed overlapping with each other along the rotational axis direction X (upper-lower direction) of the rotary electric machine.

Although, as shown in FIGS. 5A and 5B, the stepped portion 24*a*1 is herein arranged at a position, of the plate portion 24*a*, closer to the extended portion 24*b*, stepped portions 24*a*1 are arranged at different positions, corresponding to the respective phases of current supplied to the first coil end plates 24. That is, the above-described cross-points are generated at different positions of the respective plate portions 24*a* of first coil end plates 24 (see FIG. 6), corresponding to the respective phases of current supplied to the first coil end plates 24. Accordingly, first coil end plates 24 provided with respective stepped portions 24*a*1 arranged at different positions, corresponding to the phases of current, are used. Therefore, for example, in a case that three phase current in UWV phases is supplied from outside, first coil end plates in three kinds of shapes having respective stepped portions 24*a*1 at three different positions of plate portions 24*a* are used, as shown in FIG. 6.

In case of a first coil end plate 24 (phase U) in which a current in phase U flows, the stepped portion 24*a*1 is, as shown in FIG. 6, arranged more concretely closer to the extended portion 24*c*. In case of a first coil end plate 24 (phase V) in which a current in phase V flows, the stepped portion 24*a*1 is arranged at a position of the midpoint between the extended portion 24*b* and the extended portion 24*c*. In case of a first coil end plate 24 (phase W) in which a current in phase W flows, the stepped portion 24*a*1 is arranged at a position closer to the extended portion 24*b*. However, as the positions of stepped portion 24*a*1 changes with the number of coil turns (the number of turns of a coil loop) formed in the radial direction and the circumferential directions of the stator core 10, the positions of stepped portions 24*a*1 are not limited to the example shown in FIG. 6. Incidentally, the above-described first coil end plate 24 in FIG. 5 is the first coil end plate 24 (phase W) in FIG. 6, shown as an example.

First coil end plates 24 (phase U), 24 (phase V), and 24 (phase W) having a stepped portion 24*a*1 are, as shown in FIG. 6, disposed, on one end surface side of the stator core 10, in lamination along the rotation axis X direction of the rotary electric machine, and are disposed on the uppermost layers of plural first coil end plates 22, 23, 24. That is, the first coil end plates 22, 23, 24 are laminated on the one end surface of the stator core 10 in a number obtained by multiplication between the number of coil turns (the number of turns of a coil loop) and the number of phases of current, as described later, (see FIG. 8 described later), wherein the first coil end plates 24 (phase U), 24 (phase V), and 24 (phase W) having a stepped portion 24*a*1 are, as shown in FIG. 6, laminated on the uppermost three layers such that the positions of the stepped portion 24*a*1 are superimposed on each other. Thus, for the stator 101 in the present embodiment, when the first coil end plates 22, 23, 24 are laminated on the end surface of the stator core 10, the first coil end plates 24 having a stepped portion 24*a*1 are disposed uppermost, and other first coil end plates 22, 23 without a stepped portion 24*a*1 are not disposed on the first coil end plates 24 having a stepped portion 24*a*1. Thus, it is possible to prevent generation of a wasteful space (gap) due to the step at a stepped portion 24*a*1.

Figure 7:
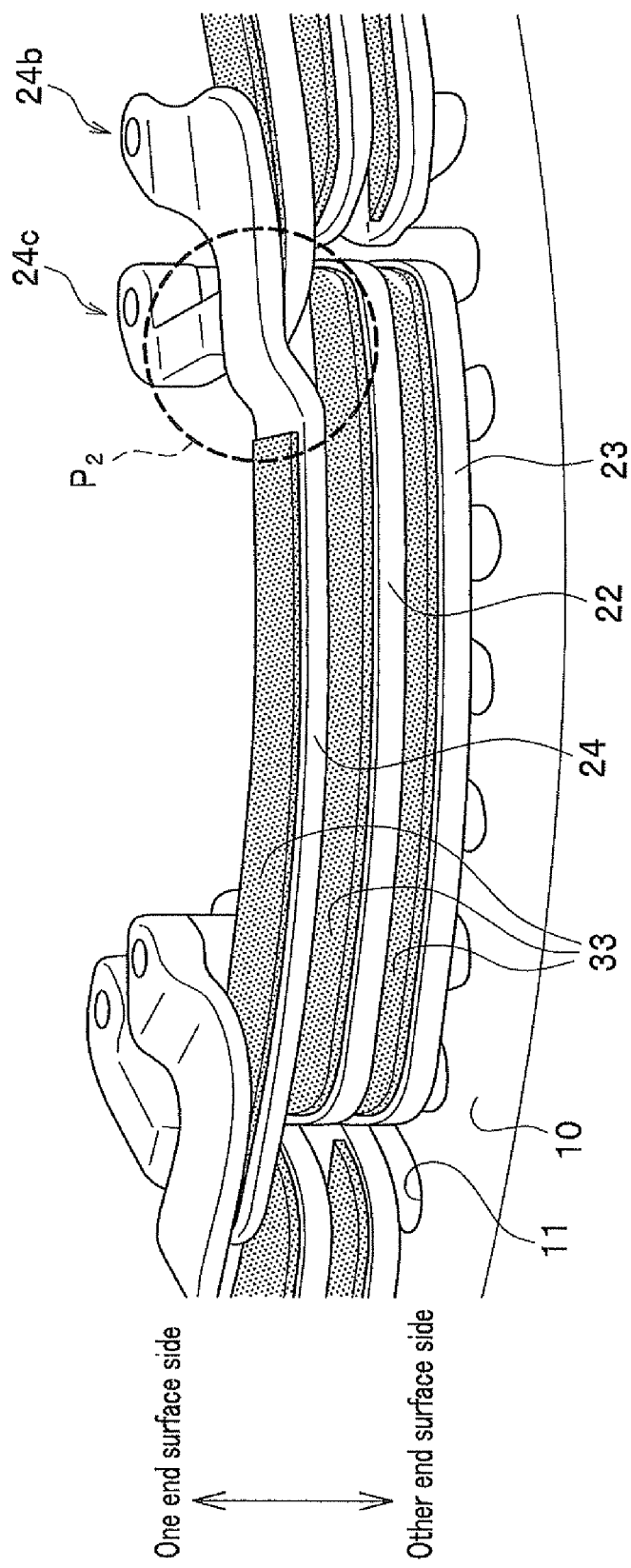
FIG. 7 shows an example of disposing first coil end plates that form a part of the stator coil of the stator, for a rotary electric machine, in the embodiment according to the invention and shows a part of an enlarged view of part A in FIG. 1.

A first coil end plate 24 having such a stepped portion 24*a*1 is disposed on the one end surface side, as shown in FIG. 7, such that the end portion side of the plate portion 24*a* overlaps with the end portion side of another first coil end plate 24 forming an adjacent coil turn. As shown in FIG. 7, the first coil end plate 24 is disposed such that the extended portion 24*b* thereof intersects with the extended portion 24*c* of the adjacent first coil end plate 24. That is, the stepped portion 24*a*1 of the first coil end plate 24 is formed at the part of intersection with the other first coil end plate 24, in other words, at the cross-point shown in part P$_2$ in FIG. 7. Thus, for the stator 101 in the present embodiment, the extended portions of a plurality of first coil end plates 24 are disposed, intersecting with each other at the positions of the respective stepped portions 24*a*1. Thus, a plurality of coil turns can be connected while the height of laminated first coil end plates 24 is restricted from becoming large. In FIG. 6, sand hatching represents first coil end plates 22, 23, 24 in which current in U-phase flows, cross hatching represents first coil end plates 22, 23, 24 in which current in V-phase flows, and dot hatching represents first coil end plates 22, 23, 24 in which current in W-phase flows. FIG. 7 shows a part of an enlarged view of part A in FIG. 1, extracting a stator coil 20 partially for one phase (phase W).

The characteristics of the structure common to the first coil end plate 22, 23, 24 will be described below. The plate portions of the first coil end plates 22, 23, 24 are, as shown in FIG.

1, formed such as to extend along the circumferential direction of the stator core 10, wherein the first coil end plates 22, 23, 24 are arranged on the end surface of the stator core 10. That is, the first coil end plates 22, 23, 24 are, as shown in FIGS. 4A, 4B, and 5A, formed with curvature, matching with the shape of the end surface of the stator core 10.

The plate portions of first coil end plates 22, 23 are formed such as to have the same area size in a plan view, as shown in FIGS. 4A and 4B and to have the same length along the circumferential direction of the stator core 10. On the other hand, the plate portion of a first coil end plate 24 is formed such as to have a larger area, in a plan view as shown in FIG. 5A, than the areas of the plate portions of first coil end plates 22, 23 (see FIGS. 4A and 4B) and to have a length along the circumferential direction of the stator core 10 larger than the lengths of the plate portions of first coil end plates 22, 23.

The pairs of extended portions of first coil end plates 22, 23, 24, as shown in FIGS. 4A to 5B, respectively have a certain distance therebetween and are extended from one end side of the plate portions 22a, 23a, 24a. As shown in FIG. 3, the paired extended portions of each of the first coil end plates 22, 23, 24 are thereby electrically connected with the connecting end portions 21a of coil segment 21 respectively received by two different slots 11 of the stator core 10. The distances between the respective pairs of the extended portions of first coil end plates 22, 23 are formed to be equal to each other, as shown in FIGS. 4A and 4B. The distance between the pair of extended portions of a first coil end plate 24 is formed to be larger than the distances of the pair of extended portions of first coil end plates 22, 23 (see FIGS. 4A and 4B).

The respective pairs of the first extended portions of first coil end plates 22, 23, 24 are, as shown in FIG. 1, formed such as to extend along the radial direction of the stator core 10, wherein the first coil end plates 22, 23, 24 are arranged on the end surface of the stator core 10. The respective pairs of the second extended portions of the first coil end plates 22, 23, 24 are formed such as to extend along the same direction, namely the circumferential direction of the stator core 10. Thus, for the stator 101 in the present embodiment, the extension directions of the pairs of the first extended portions and the pairs of the second extended portions of first coil end plates 22, 23, 24 are perpendicular to each other, and the extension directions of the pairs of the second extended portions of the first coil end plates 22, 23, 24 are the same. Accordingly, when a plurality of first coil end plates 22, 23, 24 are laminated along the rotation axis direction of the rotary electric machine, the second extended portions of the first coil end plates 22, 23, 24 are not superimposed on the first extended portions of other first coil end plates 22, 23, 24. Thereby, the space for fastening by fastening members 32 (see FIG. 3) can be ensured.

In a state that the first coil end plates 22, 23, 25 are disposed on the end surface of the stator core 10 as shown in FIG. 1, the pair of extended portions of first coil end plates 22, 23, 24 are formed such that virtual extension lines L1, L2 along the longitudinal direction of the pair of extended portions intersect with each other on the inner radius side of the stator core 10. That is, when the virtual extension lines $L_1$, $L_2$ are drawn in the respective directions in which the one extension portions 22b, 23b, 24b extend and the other extension portions 22c, 23c, 24c extend, as shown in FIGS. 4A, 4B, and 5A, the extended portions of the pair of first coil end plates 22, 23, 24 extend along directions in which the two virtual extension lines $L_1$, $L_2$ intersect with each other on the inner radius side of the stator core 10. In other words, as shown in FIGS. 4A, 4B, and 5A, the pair of extended portions of the first coil end plates 22, 23, 24 do not extend such that the above-described two virtual extension lines $L_1$, $L_2$ are parallel or separate wider from each other on the inner radius side of the stator core 10, but extend such that the two virtual extension lines $L_1$, $L_2$ separate wider from each other on the outer diameter side of the stator core 10. Thus, for the stator 101 in the present embodiment, it is possible to dispose the first coil end plates 22, 23, 24 on the end surface of the stator core 10, avoiding interference between pairs of extended portions.

As shown in FIG. 7, an elastic member 33 is preferably arranged between the first coil end plates 22, 23, 24 laminated on the end surface of the stator core 10. Thus, for the stator 101, even in case that the coil segments 21 stretch by heat or vibrate during operation, effects of these can be reduced by the elastic force of the elastic members 33. Accordingly, the joining state between the coil segments 21, the first coil end plates 22, 23, 24, and the second coil end plates 25, 26, 27 can be stabilized The first coil end plates 22, 23, 24 having the structures described above are, as shown in FIG. 8, arranged on the one end surface side of the stator core 10, and are laminated in plural layers along the rotation axis X direction of the rotary electric machine. The pairs of extended portions of the first coil end plates 22, 23, 24 laminated on the one end surface of the stator core 10 are electrically connected with the connecting end portions 21a of the coil segments 21, for example, by fastening members 32 (see FIG. 3). Incidentally, the first coil end plate 22, 23, 24 and the coil segments 21 may be fixed by crimp fitting, welding, brazing, or the like instead of fastening members 32.

The number of laminated layers of the first coil end plates 22, 23, 24 on the one end surface of the stator core 10 is concretely a number obtained by multiplication between the number of coil turns (the number of turns of a coil loop) counted along the radial direction of the stator core 10 and the number of phases of current. Herein, for the stator 101 in the present embodiment, the number of coil turns is three and the number of phases of current is three as described later. Accordingly, the number of laminated layers of the first coil end plates 22, 23, 24 is totally nine, as shown in FIG. 8. In FIG. 8, although coil end plates are laminated in ten layers on the one end surface of the stator core 10, one of these layers is a layer where the left-right reverse coil end plate 28 is disposed as shown. In FIG. 8, sand hatching represents the first coil end plates 22, 23, 24 in which current in U-phase flows, cross hatching represents the first coil end plates 22, 23, 24 in which current in V-phase flows, and dot hatching represents the first coil end plates 22, 23, 24 in which current in W-phase flows.

In such a manner, for the stator 101 in the present embodiment, as the first coil end plates 22 23, 24 in a plate shape are laminated as coil end members disposed on the one end surface side of the stator core 10, the height h1 of the coil end portion on the one end surface side can be reduced to the minimum limit. Further, heat generated by current flow in the first coil end plates 22, 23, 24 easily transfers to the stator core 10, and the cooling efficiency is thereby improved.

Figure 9:
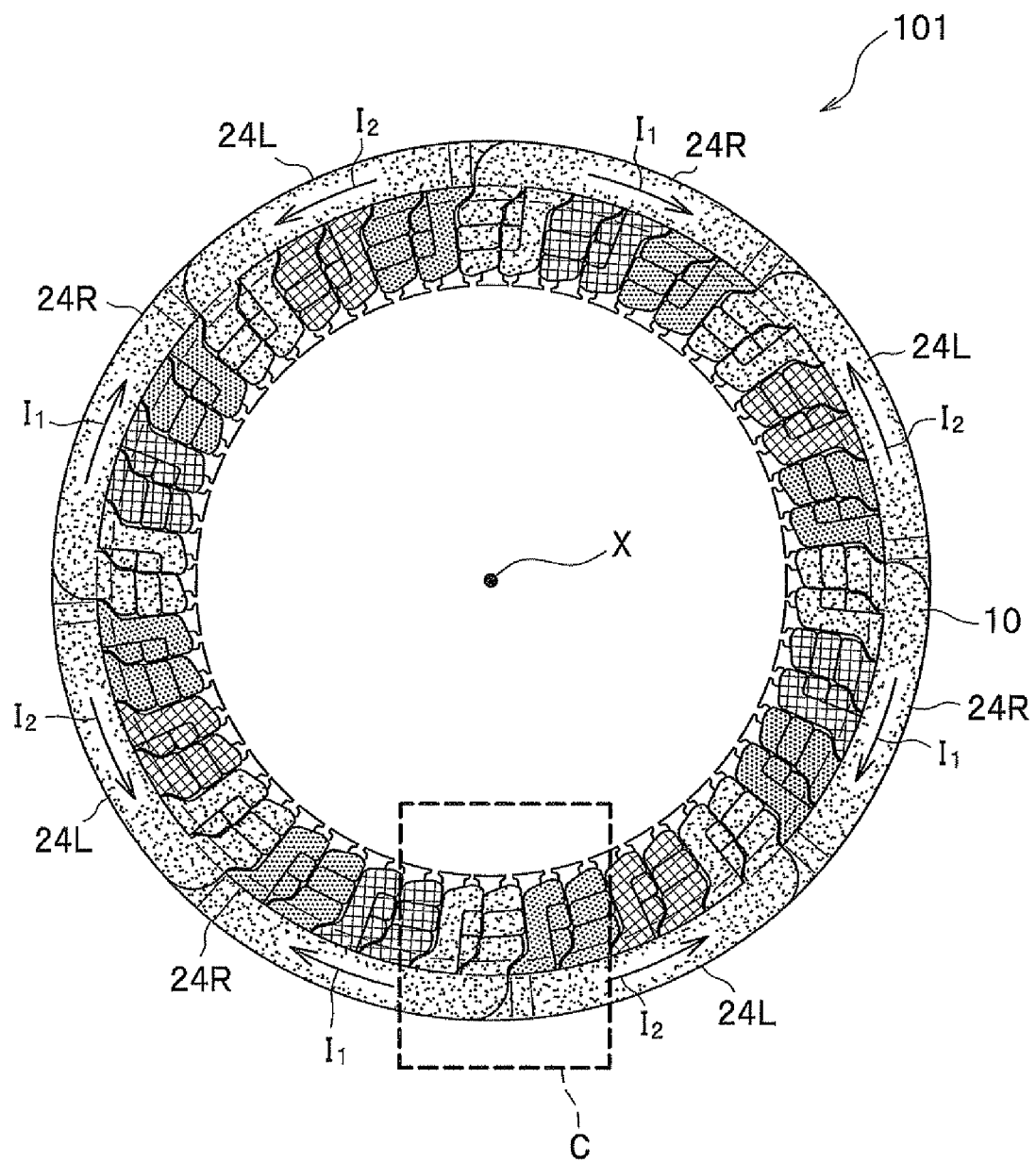
FIG. 9 shows the whole structure of the stator, for a rotary electric machine, in the embodiment according to the invention and is a plan view from the one end surface side of the stator core.
Figure 10:
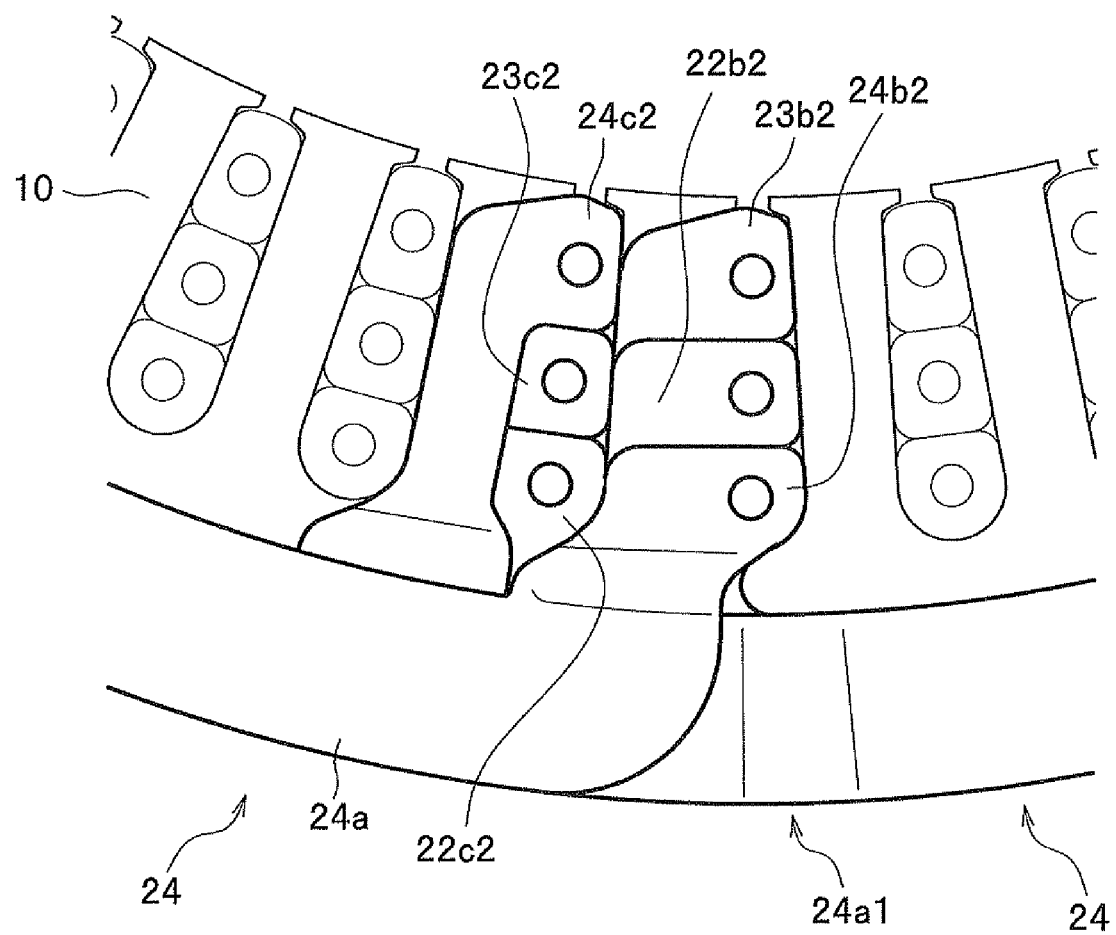
FIG. 10 shows a state of disposing the extended portions of first coil end plates that form a part of the stator coil of the stator for a rotary electric machine, in the embodiment according to the invention, and shows a part of an enlarged view of part C in FIG. 9.

As shown in FIG. 9, when the stator 101 according to the present embodiment is viewed in a plan view from the one surface side (from the above), the first coil end plates 22, 23, 24 are disposed respectively in a plural number along the circumferential direction of the stator core 10 such as to form circular annular shapes for respective layers. Further, as show in FIG. 10, the stator 101 is arranged such that the hole portions of the paired second extended portions of all the first coil end plates 22, 23, 24, which form the coil turns for the stator 101, can be easily viewed from outside. Therefore, for the stator 101 provided with such first coil end plates 22, 23, 24, fastening task by fastening members 32 can be easily carried out in assembling, and for example, the number of coil turns, the positions of the first coil end plates 22, 23, 24, and the like can be easily changed, which attains excellent assembility and maintainability.

Herein, in the first coil end plates 22, 23, 24 disposed along the circumferential direction of the stator core 10 on the one end surface of the stator core 10, a current in the same direction flows alternately, in other words, in every other first coil end plate. That is, when the first coil end plates 22, 23, 24 are disposed, as described above, in a circular annular shape on the end surface of the stator core 10, for example as shown in FIG. 9, a clockwise current $I_1$ flows, with the rotation axis X of the rotary electric machine as the center, in the respective first coil end plates 24R on the uppermost layer, and a counterclockwise current $I_2$ flows, with the rotation axis X of the rotary electric machine as the center, in the respective first coil end plates 24L on the uppermost layer. This also occurs similarly to the other first coil end plates 22, 23, 24 laminated below the uppermost layer. In such a manner, for the stator 101 according to the present embodiment, currents in opposite directions flow alternately in the first coil end plates 22, 23, 24 neighboring each other. In FIG. 9, sand hatching represents the first coil end plates 22, 23, 24 in which current in U-phase flows, cross hatching represents the first coil end plates 22, 23, 24 in which current in V-phase flow, and dot hatching represents the first coil end plates 22, 23, 24 in which current in W-phase flows. In FIG. 9, elements other than the first coil end plates 22, 23, 24 are omitted for the convenience of illustration.

Structures of Second Coil End Plates 25, 26, 27

The second coil end plates 25, 26, 27 forming a part of the stator coil 20 will be described below. Incidentally, as the second coil end plates 25, 26, 27 have structures in common with the respective structures of the above-described first coil end plates 22, 23, 24 except partial structures, description of structures in common with the first coil end plates 22, 23, 24 will be omitted, as appropriate.

Figure 11A:
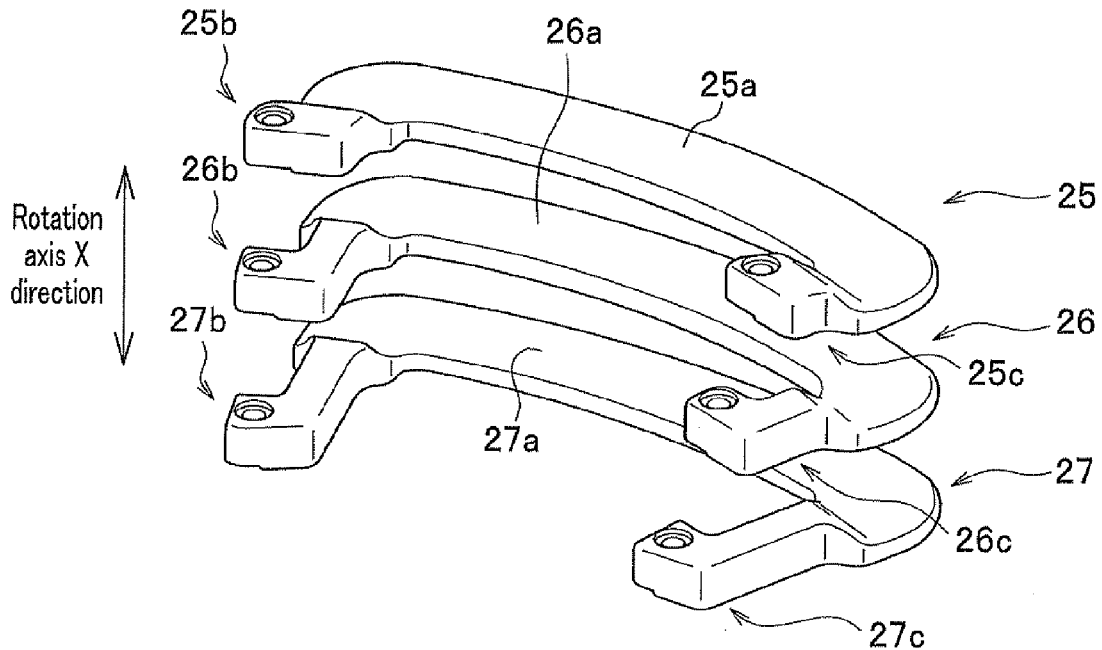

Second coil end plates 25, 26, 27 are, as shown in FIG. 11A, respectively provided with plate portions 25a, 26a, 27a in a flat plate shape and a pair of extended portions 25b, 25c, 26b, 26c, 27b, 27c extending from one end side of the plate portions 25a, 26a, 27a in radial direction of the stator core 10. The pair of extended portions 25b, 25c, the pair of extended portions 26b, 26c, and the pair of extended portions 27b, 27c are, as shown in FIG. 11A, formed with the same length. The respective pairs of extended portions of the second coil end plates 25, 26, 27 are, as shown in FIG. 11A, formed longer in the order of the pair of extended portions 27b, 27c, the pair of extended portions 26b, 26c, and the pair of extended portions 25b, 25c.

Figure 11B:
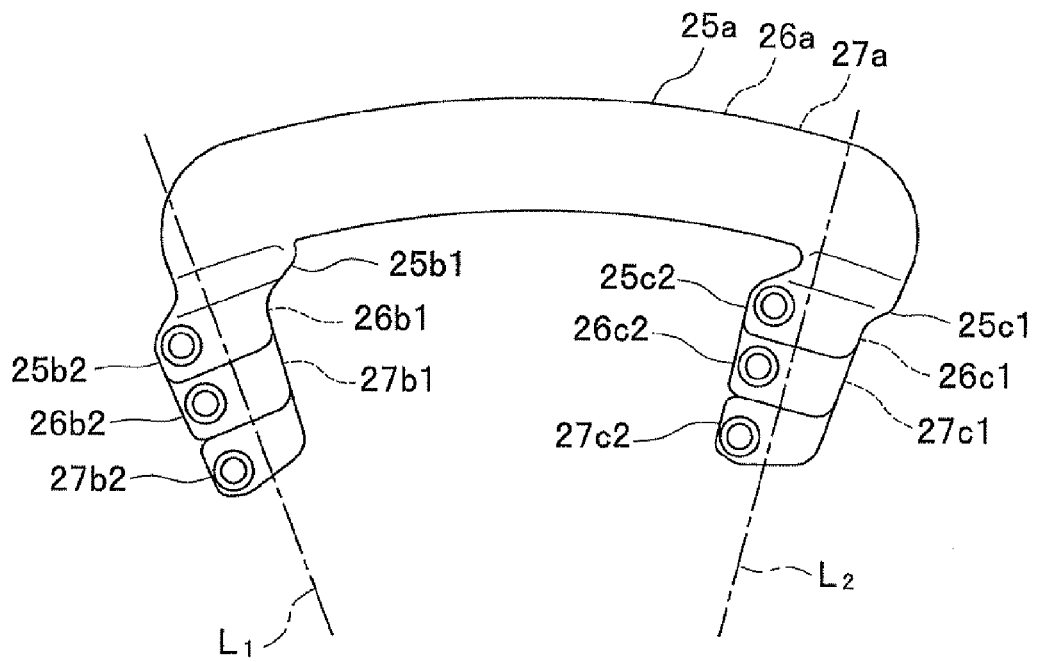

For the second coil end plates 25, 26, 27 are, as shown in FIG. 11A, all of the plate portions 25a, 26a, 27a are formed in a flat plate shape, wherein a stepped portion like the stepped portion 24a1 of the above-described first coil end plate 24 is not provided. The plate portions of the second coil end plates 25, 26, 27 are formed with an equal area size in a plan view, as shown in FIG. 11B, and with an equal length along the circumferential direction of the stator core 10. Further, the distances between the respective pairs of the extended portions of the second coil end plates 25, 26, 27 are, as shown in FIG. 11B, formed to be the same.

As shown in FIG. 11A, the plate portions of the second coil end plates 25, 26, 27 are laminated in this order along the rotation axis X direction of the rotary electric machine and are disposed to be overlapped with each other at the same position in a plan view, as shown in FIG. 11B. Thus, when the second coil end plates 25, 26, 27 are laminated, only the plate portion of the second coil end plate 25, which is arranged uppermost, is exposed while the plate portions of the other second coil end plates 26, 27 are not exposed, as shown in FIG. 11B.

Figure 8:
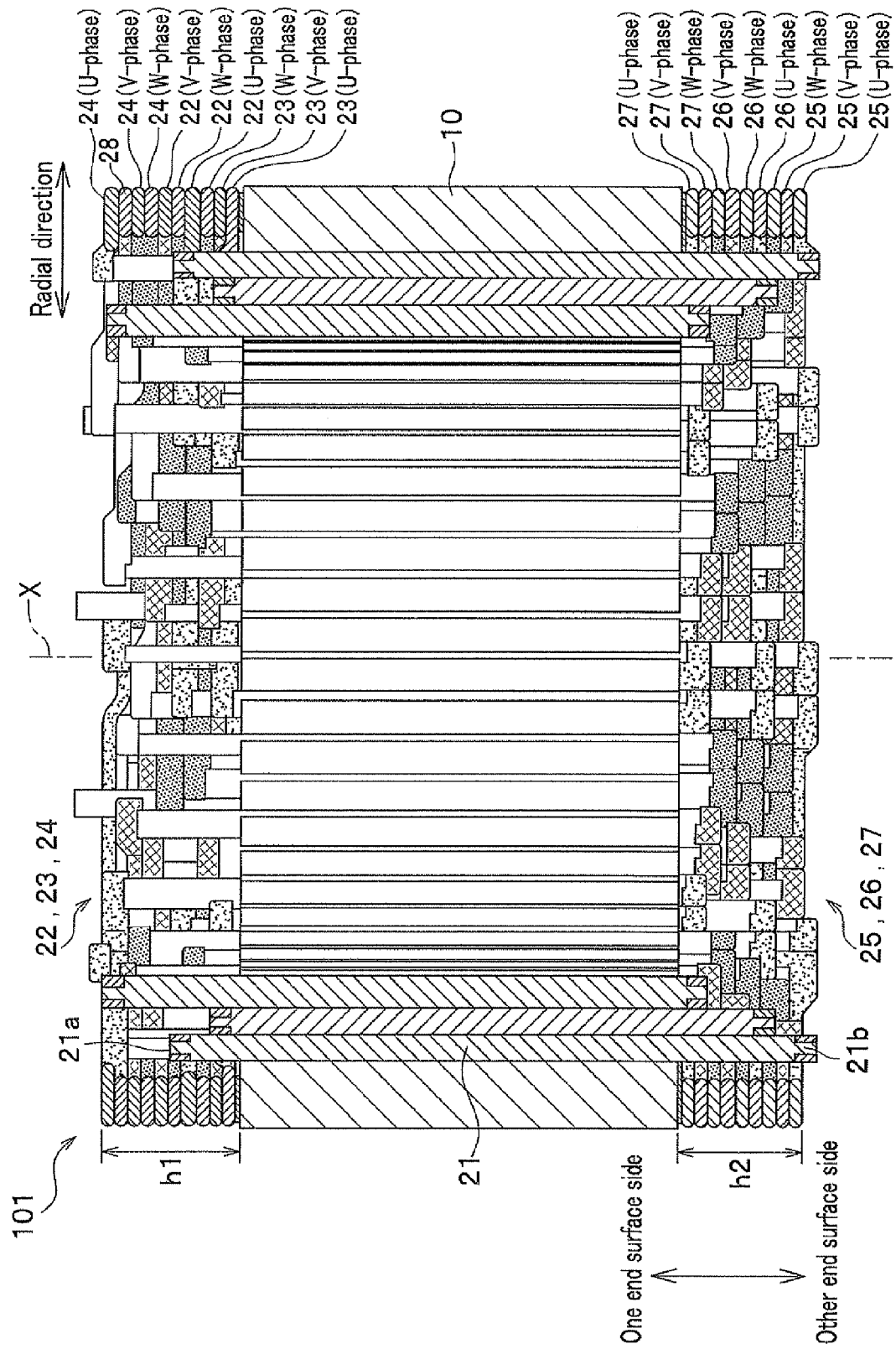
FIG. 8 is a diagram showing the whole structure of the stator, for a rotary electric machine, in the embodiment of according to the invention and is a side cross-sectional view in a state that one end surface side of the stator core faces upward.

The second coil end plates 25, 26, 27 having such structures are, as shown in FIG. 8, disposed on the other end surface side of the stator core 10, and, as shown in FIG. 8, a plurality of layers are laminated along the rotational axis direction X of the rotary electric machine. The paired extended portions of the second coil end plates 25, 26, 27 laminated on the other end surface of the stator core 10 are electrically connected with the connecting end portions 21b of coil segments 21, for example, by fastening members 32 (see FIG. 3). Incidentally, instead of fastening by fastening members 32, fixing between the second coil end plates 25, 26, 27 and the coil segments 21 may be carried out by crimp fitting, welding, brazing, or the like.

The number of layers of lamination of second coil end plates 25, 26, 27 on the other end surface of the stator core 10 is concretely a number obtained by multiplication between the number of coil turns (the number of turns of a coil loop) and the number of phases of current. Herein, for the stator 101 in the present embodiment, as the number of coil turns is three and the number of phases of current is three as described later, the number of layers of lamination of second coil end plates 25, 26, 27 is nine, as shown in FIG. 8.

For the stator 101 in the present embodiment, on the other end surface of the stator core 10, second coil end plates are arranged such that the kind (shape) of the second coil end plates is all the same along the circumferential direction of the stator core 10. For example as shown in FIG. 8, in the order from the top, the second coil end plates 27 are disposed on the first to third layers, the second coil end plates 26 are disposed on the fourth to sixth layers, and the second coil end plates 25 are arranged on the seventh to ninth layers.

Further, for the stator 101 in the present embodiment, in the second coil end plates 25, 26, 27 laminated on the other end surface of the stator core 10, currents in the respective same phases flow, corresponding to the respective layers. For the stator 101, in order to make the resistance values of coils in which currents in the respective same phases corresponding to the layers flow be equal to each other, U-phase, V-phase, and W-phase are disposed, for example, as shown in FIG. 8, in the order from the top, U-phase for the first layer, V-phase for the second layer, W-phase for the third layer, V-phase for the fourth layer, W-phase for the fifth layer, U-phase for the sixth layer, W-phase for the seventh layer, V-phase for the eighth layer, and U-phase for the ninth layer. Further, the lengths of coil segments are made equal corresponding to the respective phases.

In such a manner, for the stator 101 according to the present embodiment, the second coil end plates 25, 26, 27 in a plate shape are laminated as coil end members disposed on the other end surface side. Accordingly, the height h2 of the coil end portion on the other end surface side can be reduced to the minimum limit, as shown in FIG. 8, and heat generated by current flow in the second coil end plates 25, 26, 27 easily transfers to the stator core 10 so that the cooling efficiency is improved. Therefore, for the stator 101, as shown in FIG. 8, by laminating the first coil end plates 22, 23, 24 on the one end surface side of the stator core 10 and the second coil end plates 25, 26, 27 on the other end surface side of the stator core 10, it is possible to reduce the heights h1, h2 at the coil end portions to the minimum, and heat can be drawn away from both end surfaces of the stator core 10.

Rest of Structure of Stator Coil 20

The rest of the structure of the stator coil 20 will be described below in detail. In addition to the coil segments 21, the first coil end plates 22, 23, 24, and the second coil end plates 25, 26, 27 having been described above, the stator coil 20 is, as shown in FIG. 12, provided with the left-right reverse coil end plate 28, the power supply segment 29, the midpoint-short-circuit coil segment 30, and the midpoint connection coil segments 31. Incidentally, FIG. 12 is an enlarged view of part B in FIG. 1, extracting stator coil 20 for one phase (W-phase).

A left-right reverse coil end plate 28 reverses the direction of a current flowing in coil segments 21, first coil end plates 22, 23, 24, and second coil end plates 25, 26, 27. A left-right reverse coil end plate 28 is formed, for example, by a conductive plate-shaped member of copper, copper alloy, aluminum, aluminum alloy, or the like. However, the material for a left-right reverse coil end plate 28 is not particularly limited as long as the material is excellent in conductivity and formability.

Reversing the direction of a current concretely refers to changing the direction of a coil loop formed for a stator coil 20. That is, for the stator 101 in the present embodiment, as described later, coil segments 21, first coil end plates 22, 23, 24, and second coil end plates 25, 26, 27 are used to form coil turns along the radial direction and the circumferential direction of the stator core 10 so that two coil loops, namely, a clockwise coil loop and a counterclockwise coil loop, with the rotation axis X of the rotary electric machine as the center, are formed (see to FIG. 16 described later). Further, a left-right reverse coil end plate 28 is electrically connected with the first coil end plate that forms the end point of the clockwise coil loop and the first coil end plate that forms the start point of the counterclockwise coil loop, and is thereby used for switching between the clockwise coil loop and the counterclockwise coil loop. Coil loops formed for the stator 101 will be described later in detail (see FIG. 16 described later).

Figure 13A:
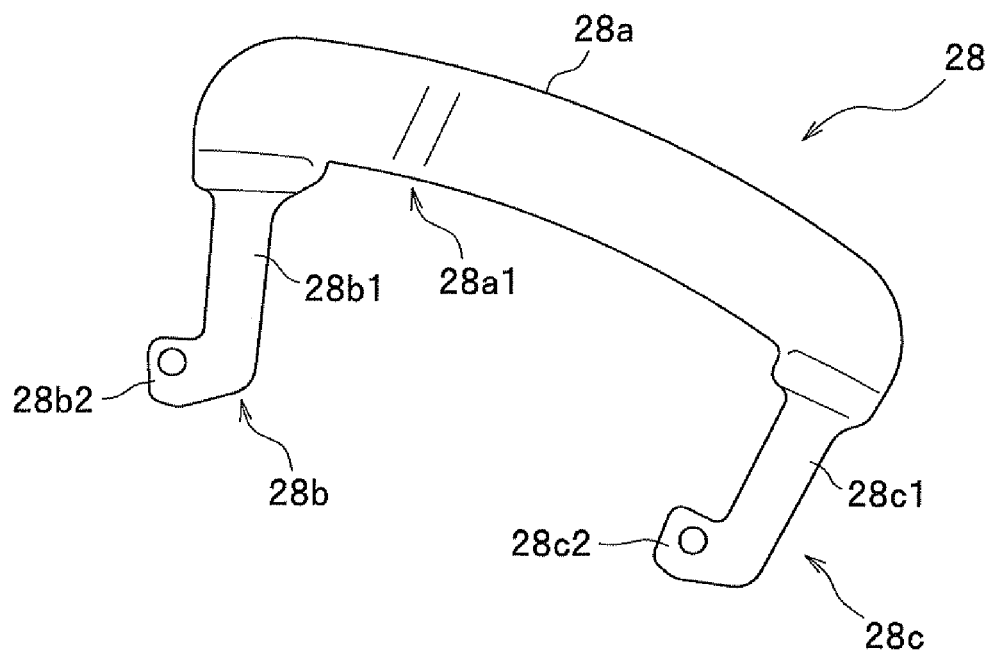

A left-right reverse coil end plates 28 is concretely provided, as shown in FIG. 13A, with a plate portion 28a formed in a plate shape and a pair of extended portions 28b, 28c extending from one end side of the plate portion 28a along the radial direction of the stator core 10. The pair of extended portion 28b, 28c are formed, as shown in FIG. 13A, in the same length. Further, the extended portions 28b, 28c are more concretely, as shown in FIG. 13A, provided with a pair of first extended portions 28b1, 28c1 extending from the one end side of the plate portion 28a, and a pair of second extended portions 28b2, 28c2 respectively extending from the one end side of the pair of the first extended portions 28b1, 28c1.

Each of the second extended portions 28b2, 28c2 is provided with a penetrating hole portion into which, for example, a fastening member 32 (see FIG. 3) is inserted when the left-right reverse coil end plates 28 and a coil segment 21 are connected. However, such hole portions may be not formed in case of joining a left-right reverse coil end plate 28 and coil segments 21 by a method, such as welding.

Similarly to a first coil end plate 24 described above, a plate portion 28a is, as shown in FIG. 13A, provided with a stepped portion 28a1 formed by bending the plate portion 28a that is in a plate shape. Similarly to the stepped portion 24a1 of a first coil end plate 24 described above, the stepped portion 28a1 is formed such as to be disposed at the cross-point of intersection with the extended portion of another coil end plate. Incidentally, the stepped portion 28a1 is herein, as shown at part $P_3$ in FIG. 12, disposed at the cross-point of intersection with the midpoint-short-circuit coil end plate 30 disposed neighboring.

Similarly to the first coil end plates 24 described above, stepped portions 28a1 are arranged at different positions, corresponding to the respective phases of current supplied to the left-right reverse coil end plates 28. For example, in a case that three phase current in UWV phases is supplied from outside, left-right reverse coil end plates 28 in three kinds having respective stepped portions 28a1 at three different positions are used. The left-right reverse coil end plate 28 shown in FIG. 13A is an example where current in W-phase flows.

A left-right reverse coil end plate 28 with such a structure is, as shown in FIG. 12, laminated on first coil end plates 22, 23 on the one end surface side of the stator core 10, and is electrically connected with the respective connecting end portions 21a of coil segments 21 inserted in two different slots 11 of the stator core 10, for example, by fastening members 32 (see FIG. 3). Incidentally, fixing between a left-right reverse coil end plate 28 and coil segments 21 may be carried out by crimp fitting, welding, brazing, or the like instead of using fastening members 32.

A power supply coil segment 29 is used to supply current from an external power source to coil segments 21, first coil end plates 22, 23, 24, second coil end plates 25, 26, 27, and a left-right reverse coil end plates 28. A power supply coil segment 29 is formed, for example, by a conductive bar-shaped member of copper, copper alloy, aluminum, aluminum alloy, or the like, and has a linear shape, as shown in FIG. 12. However, the material for a power supply coil segment 29 is not particularly limited as long as the material is excellent in conductivity and formability. Though not shown, similarly to the case of the above-described coil segments 21, three kinds of power supply coil segments 29 with different lengths are used, corresponding to the number of phases of current supplied from outside.

A power supply coil segment 29 with such a structure is, as shown in FIG. 12, inserted in a slot 11 of the stator core 10 on the one end surface side of the stator core 10. The other connecting end portion, on the other end surface side, of the power supply coil segment 29 received in the slot 11, is exposed on the other one end surface side of the stator core 10, and is electrically connected with one of the pair of second extended portions (see FIGS. 11A and 11B) of the second coil end plate 25, 26, or 27 by a fastening member (see FIG. 3). The connecting end portion 29a, on the one end surface side, of the power supply coil segment 29 is exposed on the one end surface side of the stator core 10, and is electrically connected with an external power source, not shown. Incidentally, a power supply coil segment 29 and first coil end plates 22, 23, 24 may be fixed by crimp fitting, welding, brazing, or the like instead of fastening members 32.

The midpoint-short-circuit coil end plate 30 is used to short circuit, at midpoint, currents in plural phases supplied from outside to the coil segments and the coil end plates. The midpoint-short-circuit coil end plate 30 is formed, for example, by a conductive plate-shaped member of copper, copper alloy, aluminum, aluminum alloy, or the like, and has a shape with three protrusions, as shown in FIG. 13A. However, the material for the midpoint-short-circuit coil end plate 30 is not particularly limited as long as the material is excellent in conductivity and formability.

Figure 13B:
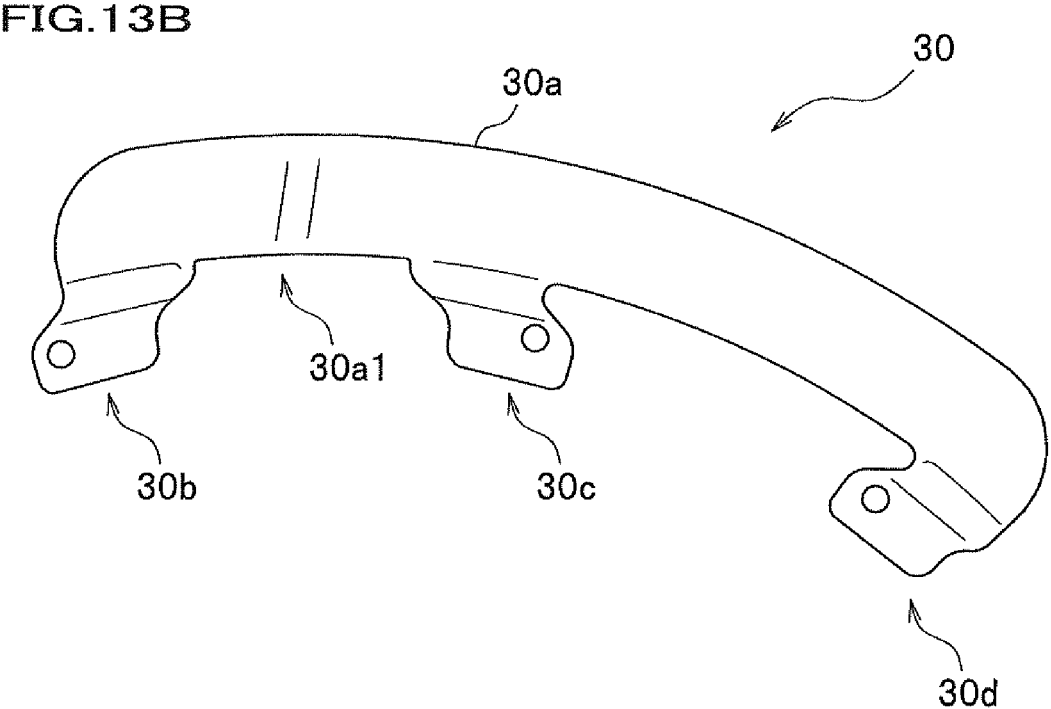

The midpoint-short-circuit coil end plate 30 concretely has, as shown in FIG. 13B, a plate portion 30a formed in a flat plate shape and three extended portions 30b, 30c, 30d extended from one end side of the plate portion 30a. These three extended portions 30b, 30c, 30d are formed, as shown in FIG. 13A, in the same length.

As shown in FIG. 13B, the extended portions 30b, 30c, 30d are provided with penetrating holes into which, for example, a fastening member 32 (see FIG. 3) is inserted when the midpoint-short-circuit coil end plate 30 and midpoint connection coil segments 31 are connected. However, in case that the midpoint-short-circuit coil end plate 30 and the midpoint connection coil segments 31 are joined by another method, such as welding, it is not necessary to form such hole portions. Incidentally, the midpoint-short-circuit coil end plate 30 and the midpoint connection coil segments 31 can also be formed integrally.

Similarly to a first coil end plate 24 described above, the plate portion 30a is, as shown in FIG. 13B, provided with a stepped portion 30a1 formed by bending the plate portion 30a that is in a plate shape.

Similarly to the stepped portion 24a1 of the first coil end plate 24 described above, the stepped portion 30a1 is formed such as to be disposed at the cross-point of intersection with the extended portion of another coil end plate. Incidentally, the stepped portion 30a1 is herein, as shown at part $P_4$ in FIG. 12, disposed at the cross-point with the first coil end plate 24 disposed neighboring.

The midpoint-short-circuit coil end plate 30 with such a structure is, as shown in FIG. 12, layered on first coil end plates 22, 23 on the one end surface side of the stator core 10, and is electrically connected with three midpoint connection segments 31 inserted in three different slots 11 of the stator core 10, for example, by fastening members 32 (see FIG. 3). Incidentally, fixing between the midpoint-short-circuit coil end plate 30 and the midpoint connection segments 31 may be carried out by crimp fitting, welding, brazing, or the like instead of using fastening members 32.

The midpoint connection coil segments 31 are used to electrically connect the midpoint-short-circuit coil end plate 30 and the second coil end plates 25, 26, 27. A midpoint connection coil segment 30 is formed, for example, by a conductive bar-shaped member of copper, copper alloy, aluminum, aluminum alloy, or the like, and has a linear shape, as shown in FIG. 12. However, the material for a midpoint connection coil segment 31 is not particularly limited as long as the material is excellent in conductivity and formability. Incidentally, in other points, the structure of a midpoint connection segment 31 is similar to the structure of a coil segment 21, more description will be omitted here.

Herein, for the left-right reverse coil end plates 28, the power supply coil segments 29, the midpoint-short-circuit coil end plate 30, and the midpoint connection segments 31, which have been described above, an elastic member 33 is preferably arranged between respective coil end plates, as shown in FIG. 12, similarly to the case of the above-described first coil end plates 22, 23, 24. Thus, for the stator 101, for example, even in case that the coil segments 21 stretch by heat or vibrate during operation, effects of these can be reduced by the elastic force of the elastic members 33. Accordingly, the joining state between the coil segments 21 and the respective coil end plates can be stabilized.

For the stator 101 having a structure as has been described above in the present embodiment, plural coil segments 21 are received by each slot 11 of the stator core 10, and plural coil segments 21 are electrically connected with each other at the end portions thereof through plate-shaped first coil end plates 22, 23, 24, and second coil end plates 25, 26, 27. It is thereby possible to easily form a coil loop around the rotation axis X, without extending coil end portions along the rotation axis X direction of the rotary electric machine.

Further, for the stator 101, for example, in case that coil turns, which are current paths in an annular shape, are formed by coil segments 21, first coil end plates 22, 23, 24 and second coil end plates 25, 26, 27, the extended portions of a plurality of first coil end plates 24 can be disposed in a state of intersecting with each other at the positions of the stepped portions 24a1 in order to form a coil loop by connecting a plurality of coil turns. Consequently, for the stator 101, it is possible to reduce to the minimum the installing space for the first coil end plates 24 in forming a coil loop and thereby attain space saving.

Further, for the stator 101, plural coil segments 21 are received by each slot 11 of the stator core 10, and plural coil segments 21 are electrically connected with each other at the end portions thereof through plate-shaped coil end plates, and coil turns are thereby formed. Further, plural such coil turns are formed along the circumferential direction of the stator core 10. Thus, it is possible to easily form a lap-wound coil loop.

For such a stator 101, as a stator coil 20 is formed without using U-shaped leads which requires bending and forging, the manufacturing cost can be reduced. Further, for the stator 101, as the first coil end plates 22, 23, 24 and the second coil end plates 25, 26, 27 as coil end members in a flat plate shape are arranged in lamination respectively on one end surface and on the other surface of the stator core 10, the height of the coil end portions on the respective end surfaces of the stator core 10 can be reduced to the minimum. Accordingly, the volume of the coil end portions can be reduced while enabling lap winding, which makes downsizing of the entire device possible.

Operation of Stator 101

Figure 19A:
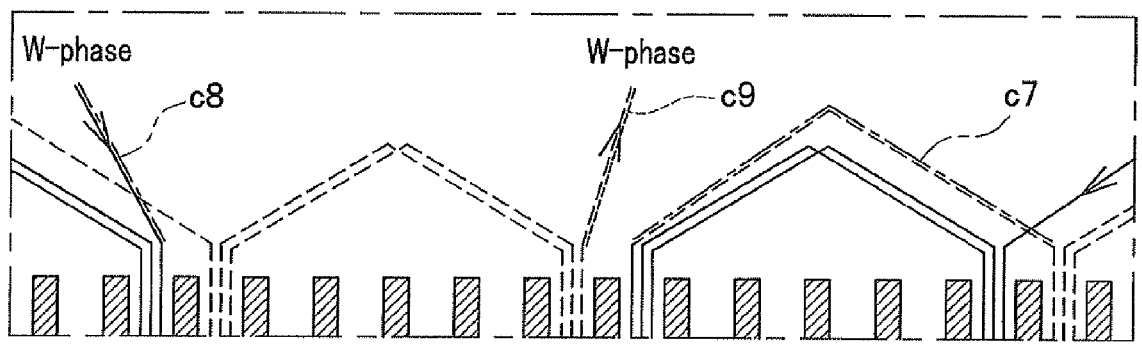
Figure 19B:
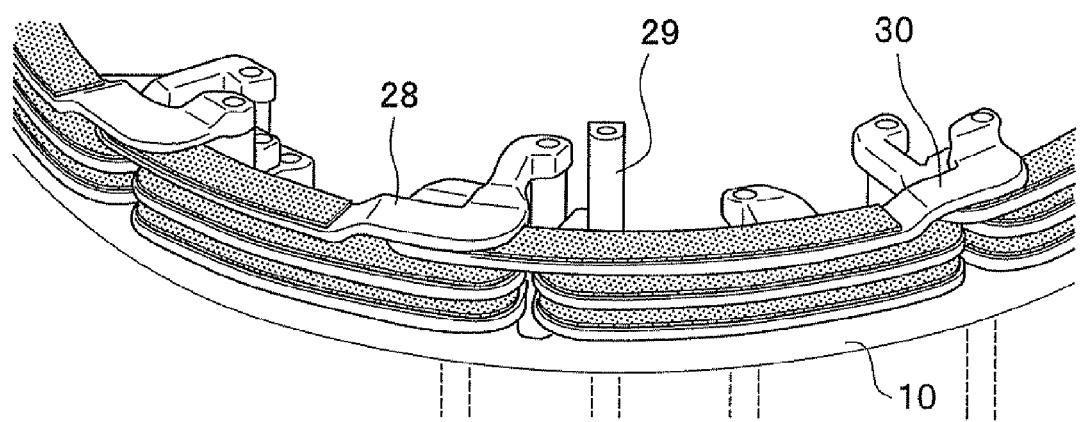

The operation of the stator 101 in the present embodiment, in other words, the details of coil turns and coil loops formed for the stator 101 will be described below, referring to FIGS. 14 and 19B.

First, coil turns will be described below, referring to FIGS. 14 and 15. FIG. 14 extracts for one phase (W-phase) from the stator coils 20 shown in FIG. 1 and shows coil turns in two groups formed by coil segments 21 neighboring each other, first coil end plates 22, 23, 24, and second coil end plates 25, 26, 27. These coil turns in two groups are, as shown in FIG. 14, clockwise coil turns (the left side in the figure) and counterclockwise coil turns (the right side in the figure).

Figure 14:
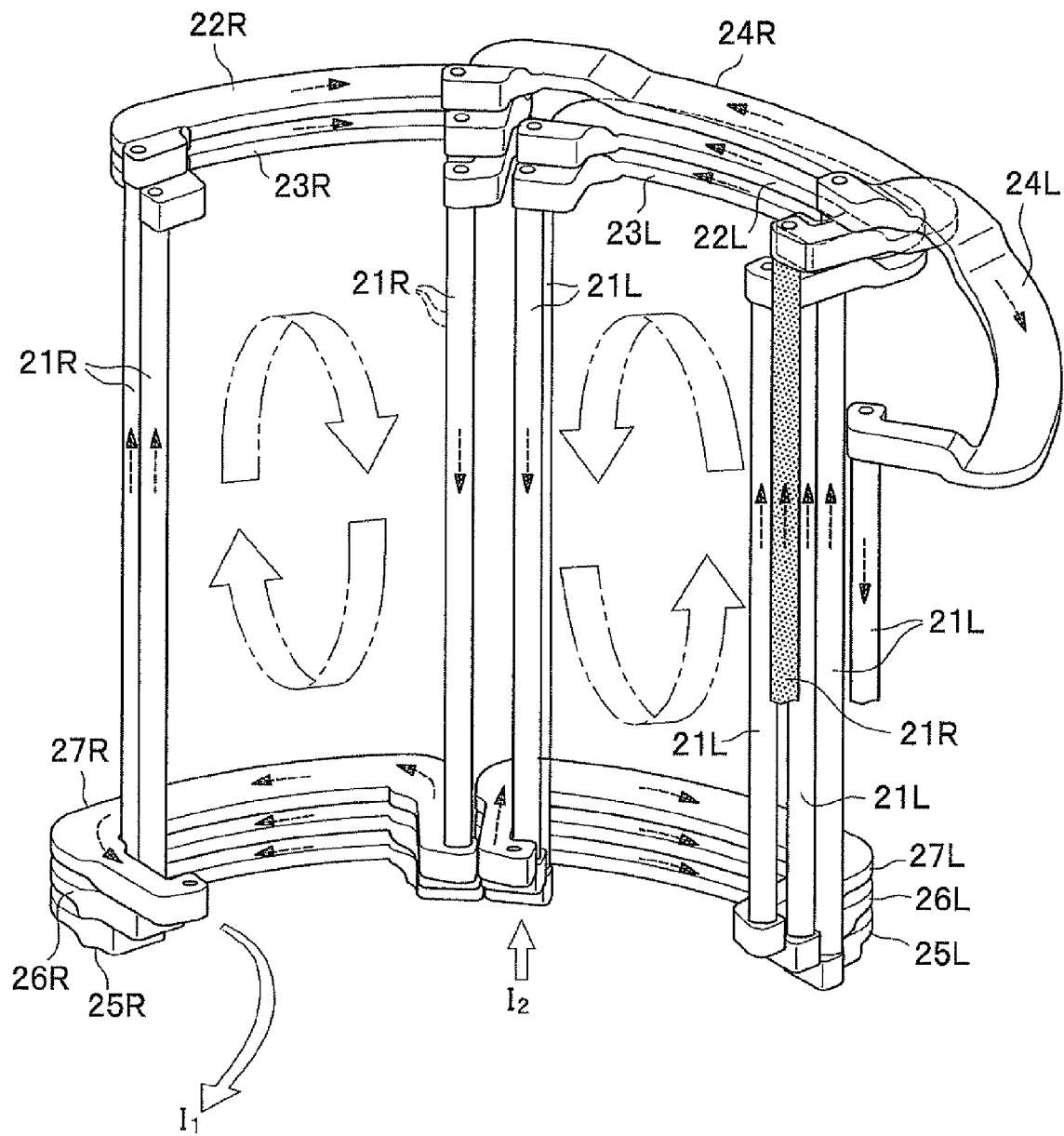
FIG. 14 is a schematic view for illustration of coil turns of the stator, for a rotary electric machine, according to the embodiment.

Such clockwise coil turns and counterclockwise coil turns are, as shown in FIG. 14, formed respectively in a plural number along the radial direction and the circumferential direction of the stator core 10, corresponding to the number of coil segments 21 which are inserted in the same or different slots 11 of the stator core 10 and corresponding first coil end plates 22, 23, 24 and second coil end plates 25, 26, 27. With these plural coil turns formed along the radial direction and the circumferential direction of the stator core 10, as shown in FIG. 14, currents flow in current paths neighboring each other along the circumferential direction of the stator core 10, in the respective directions which are opposite to each other as represented by arrows in the figure.

The clockwise coil turn group is, as shown in FIG. 14, a current path by coil segments 21R, 21R, 21R, 21R, 21R, 21R, the first coil end plates 22R, 23R, 24R, and the second coil end plates 25R, 26R, 27R. Assuming that the start of the clockwise coil turns is the coil segment 21R shown by dot hatching in FIG. 14, when a current $I_1$ is supplied to the coil segment 21R, the current $I_1$ proceeds in the order of a coil segment 21R, the first coil end plate 24R, a coil segment 21R, the second coil end plate 25R, a coil segment 21R, the first coil end plate 22R, a coil segment 21R, the second coil end plate 26R, a coil segment 21R, the first coil end plate 23R, a coil segment 21R, and the second coil end plate 27R. Thus, a clockwise coil turn group is formed wherein the current $I_1$ circulates in the radial direction of the stator core 10.

The counterclockwise coil turn group is, as shown in FIG. 14, a current path formed by coil segments 21L, 21L, 21L, 21L, 21L, 21L, the first coil end plates 22L, 23L, 24L, and the second coil end plates 25L, 26L, 27L. Assuming that the start of the counterclockwise coil turn group is the second coil end plate 27L, when a current $I_2$ is supplied to the second coil end plate 27L, the current I2 proceeds in the order of the second coil end plate 27L, a coil segment 21L, the first coil end plate 23L, a coil segment 21L, the second coil end plate 26L, a coil segment 21L, the first coil end plate 22L, a coil segment 21L, the second coil end plate 25L, a coil segment 21L, the first coil end plate 24L, and a coil segment 21L. Thus, a counterclockwise coil turn group is formed wherein the current $I_2$ circulates in the radial direction of the stator core 10.

Figure 15:
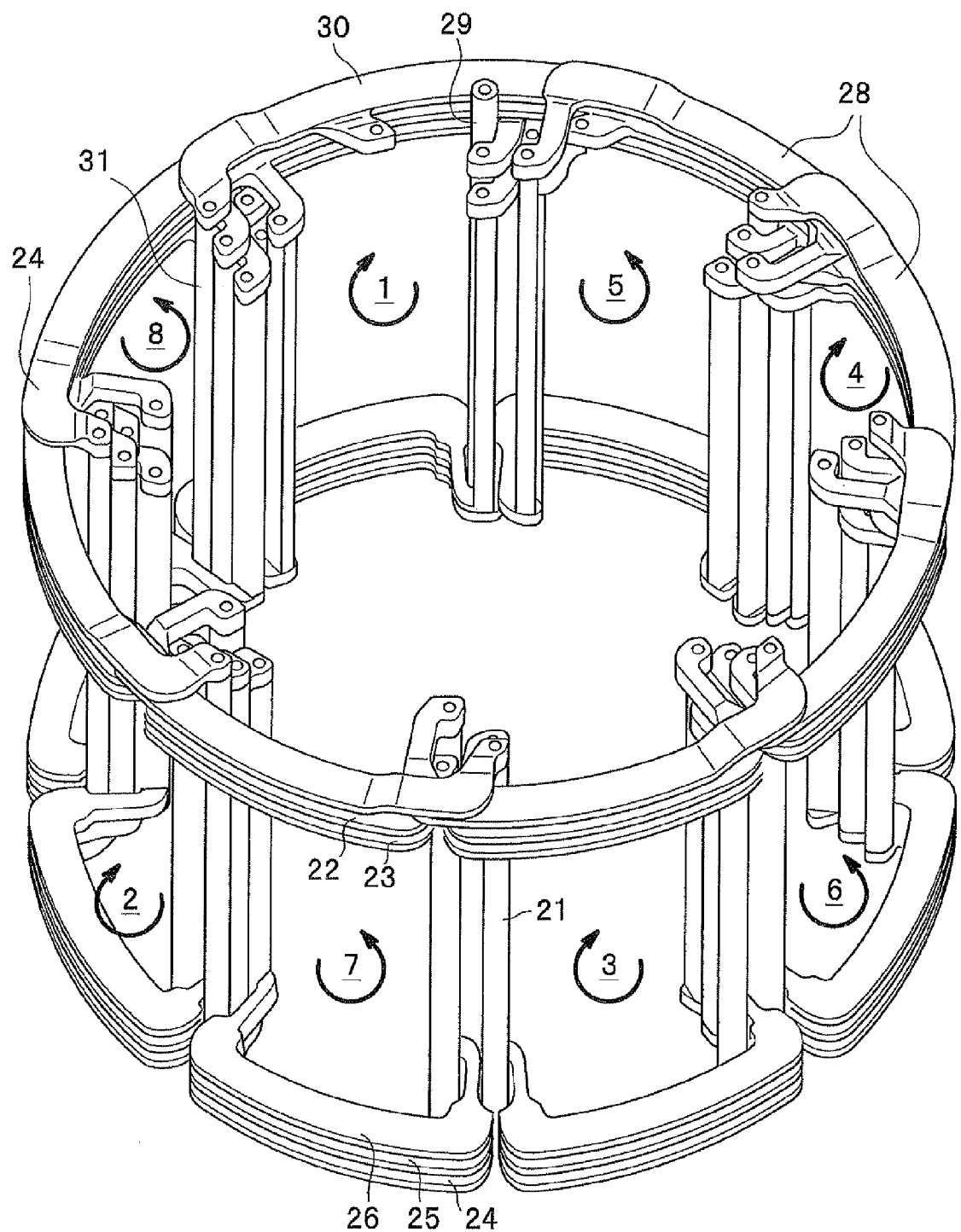
FIG. 15 shows a part of the stator coils for the stator, for a rotary electric machine, in the embodiment according the invention and is a perspective view showing a state that a coil for one phase is extracted.

Such clockwise and counterclockwise coil turns are formed, as shown in FIG. 15, in plural numbers also along the circumferential direction. FIG. 15 shows extraction from stator coils 20 shown in FIG. 1, for one phase (W-phase). When a current in W-phase is supplied to a power supply coil segment 29, the current proceeds to the clockwise coil turns in the order of '1', '2', '3', '4', and thus circuits these clockwise coil turns while proceeding counterclockwise as a whole, and thus a counterclockwise loop is formed. Then, as shown in FIG. 15, the direction of the current is switched by a left-right reverse coil end plate 28, and the current proceeds to the counterclockwise coil turns in the order of '5', '6', '7', '8', and thus circuits these counterclockwise coil turns while proceeding clockwise as a whole, and thus a clockwise loop is formed.

Herein, for the stator 101 in the present embodiment, concretely, three turns are formed between certain slots respectively as clockwise coil turns and counterclockwise coil turns. Further, four loops are formed along the circumferential direction of the stator core 10 respectively as clockwise coil turns and counterclockwise coil turns (totally eight loops) for each phase of current supplied from outside.

Coil loops will be described below, referring to FIG. 16. FIG. 16 shows the stator coil 20 for one phase (W-phase) shown in FIG. 15, as a circuit diagram. In FIG. 16, for brevity in the following description, the number of coil turn groups along the circumferential direction of the stator core 10 is assumed to be totally four (two coil groups of the clockwise coil turns and two coil groups of counterclockwise coil turns). Further, the following description will be made, assuming that the right end and the left end of the coils in FIG. 16 are joined in a closed state.

Figure 16:
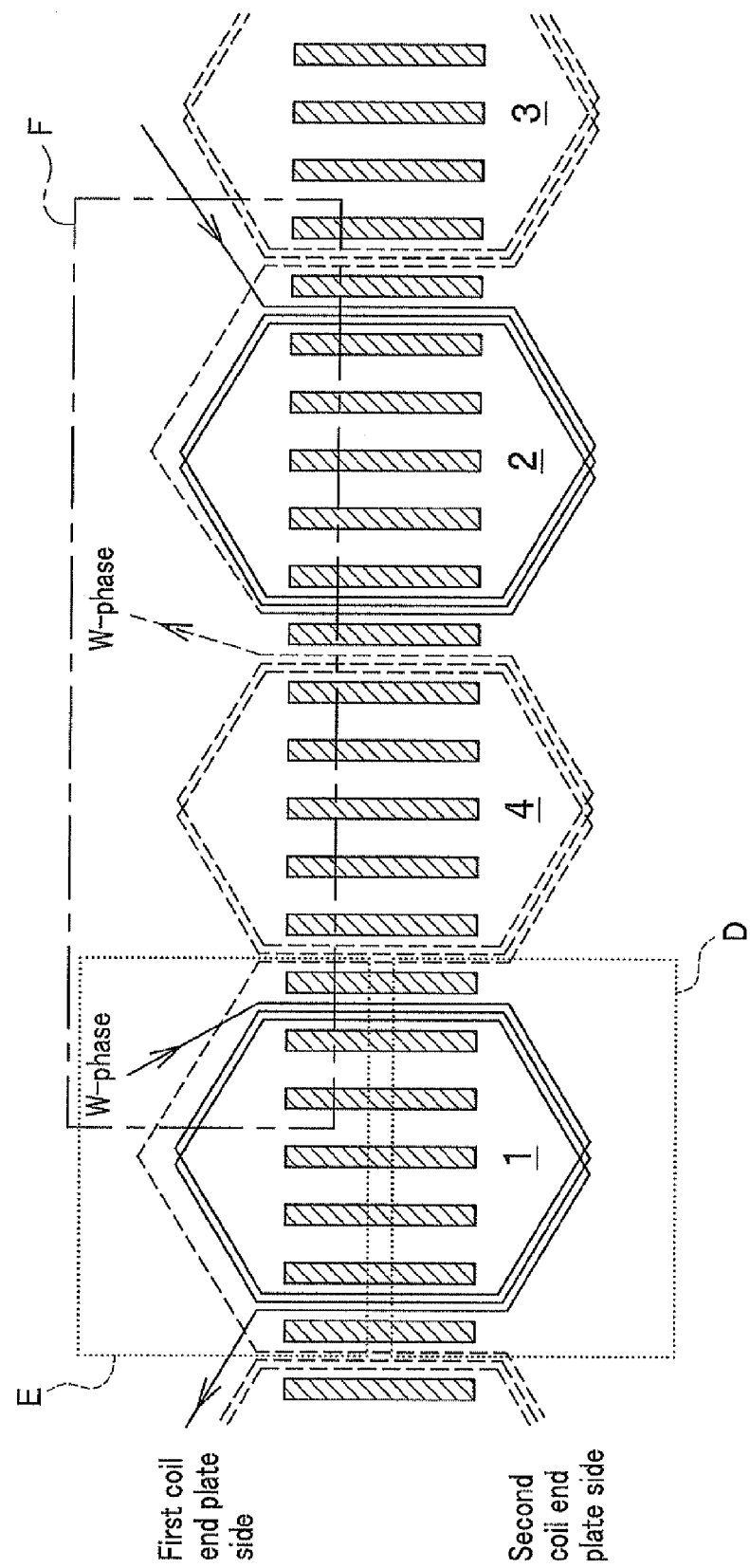
FIG. 16 is a circuit diagram for illustration of a coil loop of the stator, for a rotary electric machine, according to the embodiment of the invention.

As shown in FIG. 16, on the stator 101 in the present embodiment, if a current, for example, in W-phase is supplied from outside, this current clockwise circuits the coil turn group represented by '1' three times, then proceeds leftward, and clockwise circuits the coil turn group that is the second next on the left side and represented by '2' three times. Subsequently, as shown in FIG. 16, the direction of the current is switched at the end point of the coil turn represented by '2', then the current counterclockwise circuits the coil turn group represented by '3' three times, thereafter proceeds rightward, counterclockwise circuits the coil turn group that is the second next on the left side and represented by '4' three times, and is output to outside. That is, on the stator 101 in the present embodiment, as shown in FIG. 16, a current first circuits all clockwise coil turns, and then circuits all counterclockwise coil turns in the order of '1 (clockwise)', '2 (clockwise)', '3 (counterclockwise)', and '4 (counterclockwise)'.

Figure 17A:
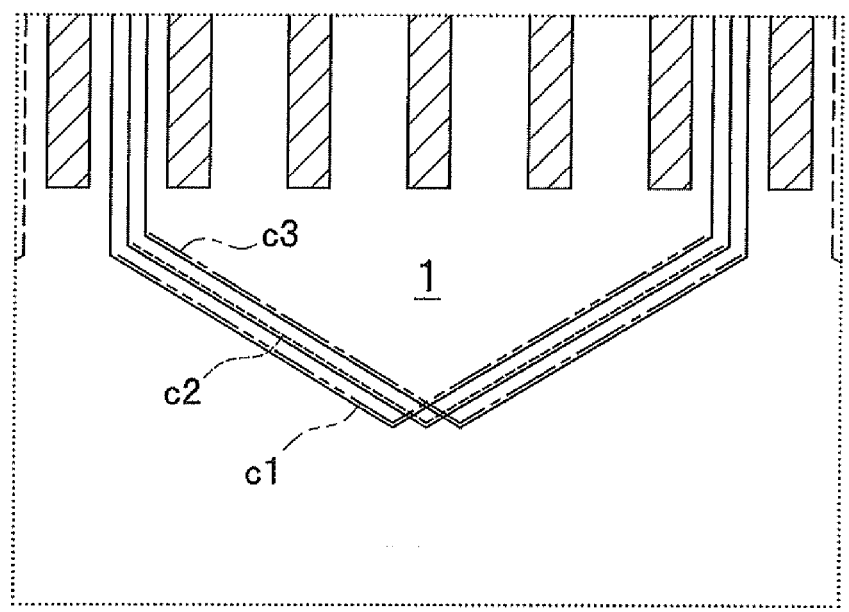
Figure 17B:
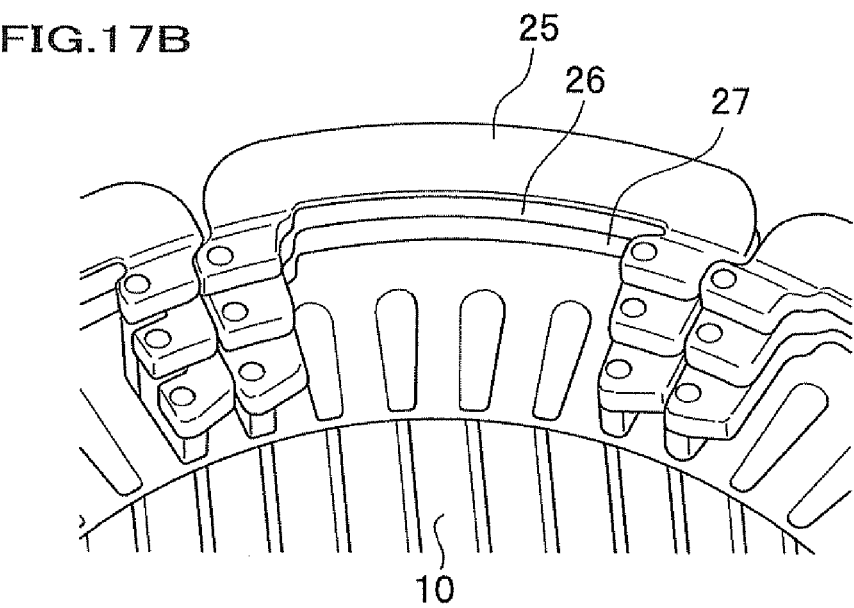

Concrete members forming part D, part E, and part F in the circuit diagram in FIG. 16 will be described below. As shown in FIGS. 17A and 17B, the member corresponding to a coil part c1 of part D is the second coil end plate 27, the member corresponding to a coil part c2 of part D is the second coil end plate 26, and the member corresponding to a coil part c3 of part D is the second coil end plate 25.

Figure 18A:
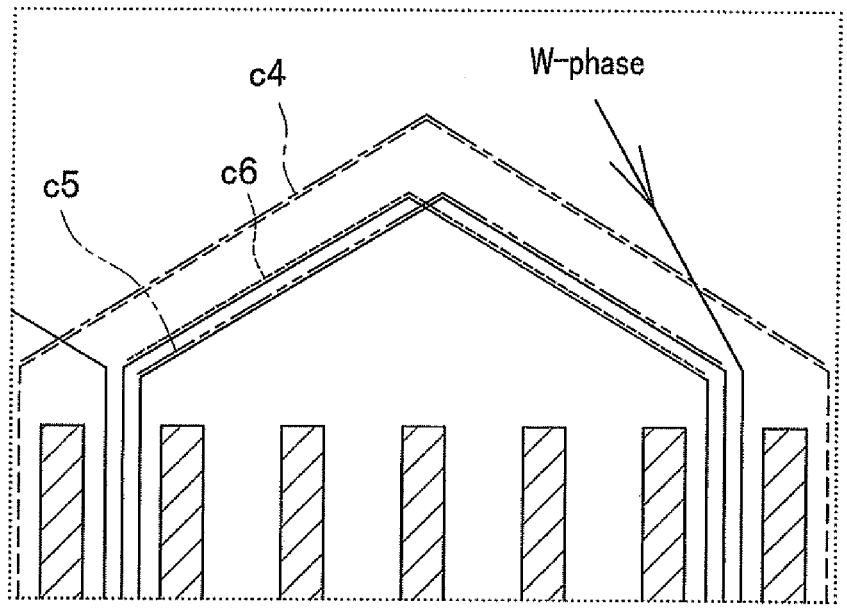
Figure 18B:
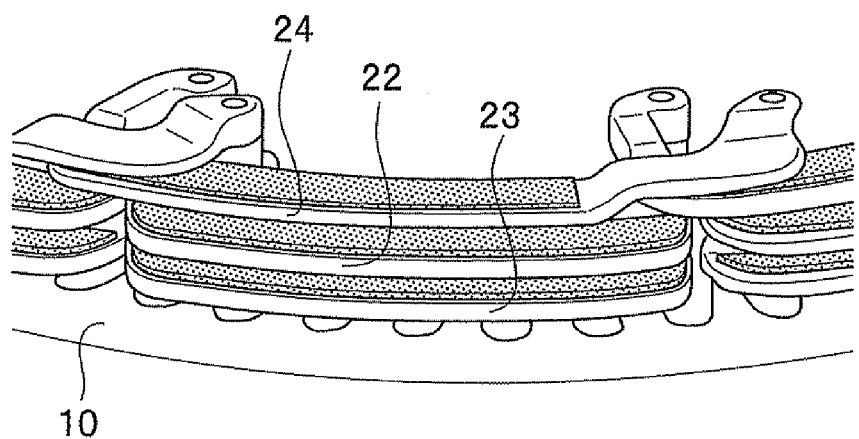

Further, as shown in FIGS. 18A and 18*b*, the member corresponding to a coil part c4 of part E is the first coil end plate 24, the member corresponding to a coil part c5 of part E is the first coil end plate 22, and the member corresponding to a coil part c6 of part E is the first coil end plate 23. Still further, as shown in FIGS. 19A and 19B, the member corresponding to a coil part c7 of part F is the left-right reverse coil end plate 28, the member corresponding to a coil part c8 of part F is the midpoint-short-circuit coil end plate 30, and the member corresponding to a coil part c9 of part F is the power supply coil segment 29.

Although a stator, for a rotary electric machine, in the present embodiment of the present invention has been concretely described with an embodiment for carrying out the invention, the spirit of the invention is not limited thereto and should be broadly interpreted, based on the descriptions set forth in the claims. Further, it is needless to say that various changes and modifications, based on the descriptions are included in the spirit of the invention.

Figure 20A:
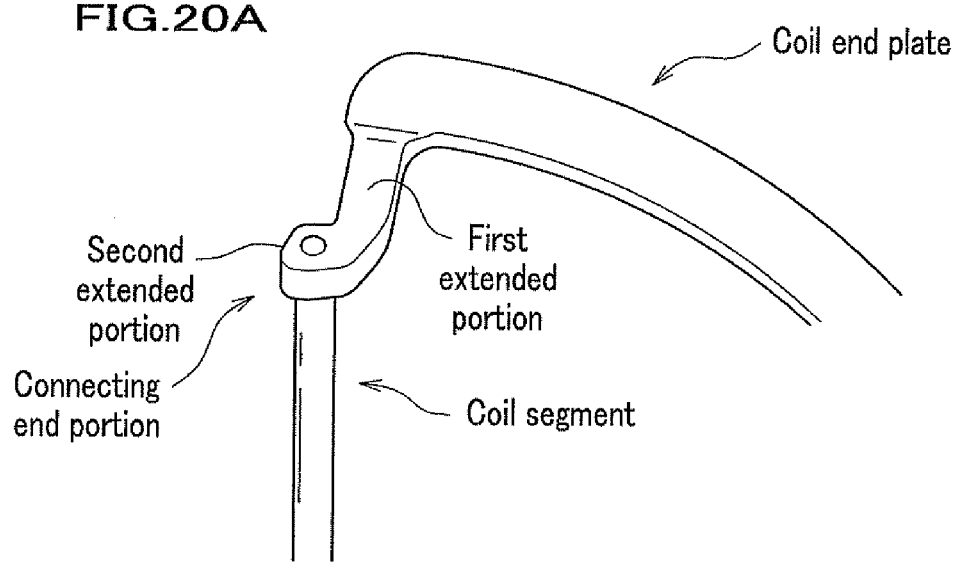

For example, for the stator 101 in the present embodiment, in connecting segments and coil end plates, as shown in FIG. 20A, the top surfaces of the connecting end portions of the respective coil segments are made in contact with the bottom surfaces of the second extended portions of the respective coil end plates, and the coil segments and the coil end plates are fixed to each other from the top by fastening members 32 (see FIG. 3) or the like, however, the manner of connecting coil segments and coil end plates is not limited thereto.

Figure 20B:
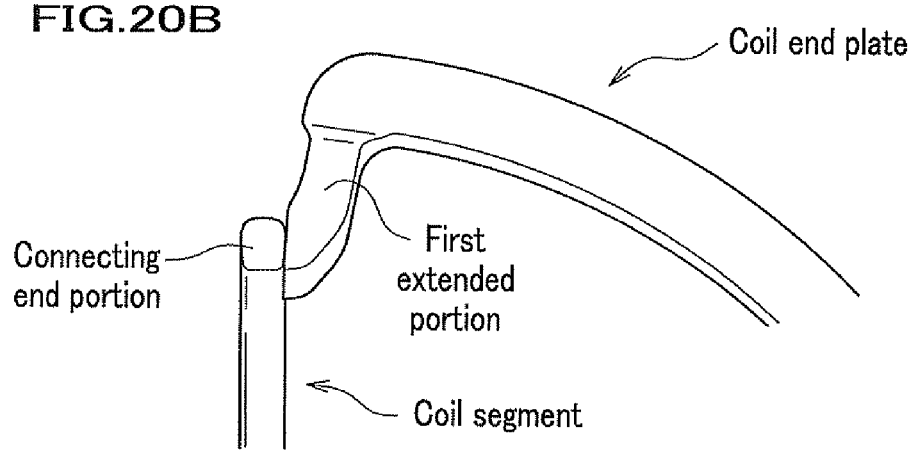

For example, as shown in FIG. 20B, coil segments and coil end plates may be fixed to each other by preparing coil end plates without a portion corresponding to the second extended portion, making the side surfaces of the connecting end portions of respective coil segments contact with the side surfaces of the respective extended portions of these coil end plates, and fixing the coil segments and the coil end plates from the side by, for example, fastening members 32 (see FIG. 3) or the like. With such an arrangement, for the stator 101, for example, even in case that stretching of coil segments by heat has occurred during operation, the joining state between the coil segments and the coil end plates is not affected, and a state that the both are always electrically connected with each other can be maintained. Accordingly, for a stator in a modified example with such an arrangement, a joining state between coil segments and coil end plates can be stabilized without using the above-described elastic members 33 (see FIG. 7 and FIG. 12).

Further, for the stator 101 in the present embodiment, fastening members 32 have been described as an example of means for joining coil segments and coil end plates, means for joining is not limited thereto, and as described above, crimp fitting, welding, brazing, or the like may be applied.

Still further, although the stator 101 in the present embodiment has a structure in which three coil turns are formed along the radial direction of the stator core 10, two coil turns or four coil turns, for example, may be formed. In case of forming two coil turns along the radial direction of the stator core 10, arrangement can be made such that two coil segments 21 are received in a slot 11 of the stator core 10, six first coil end plates 22, 23, 24 are laminated on the one end surface side of the stator core 10, shown in FIG. 8, and six second coil end plates 25, 26, 27 are laminated on the other end surface side. Further, in case of forming four coil turns along the radial direction of the stator core 10, arrangement can be made such that four coil segments 21 are received in a slot 11, twelve first coil end plates 22, 23, 24 are laminated on the one end surface side of the stator core 10, shown in FIG. 8, and twelve second coil end plates 25, 26, 27 are laminated on the other end surface side.

Yet further, for the stator 101 in the present embodiment, the first coil end plates 22, 23, 24, the left-right reverse coil end plates 28, and the midpoint-short-circuit coil end plate 30 are arranged on the one end surface side of the stator core 10, and the second coil end plates 25, 26, 27 are arranged on the other end surface side. However, the second coil end plates 25, 26, 27 may be arranged on the one end surface side of the stator core 10, and the first coil end plates 25, 26, 27, the left-right reverse coil end plates 28, and the midpoint-short-circuit coil end plate 30 may be arranged on the other end surface side of the stator core 10.

What is claimed is:

1. A stator for a rotary electric machine, comprising:
   a stator core in a sleeve shape with a plurality of slots formed at an inner circumferential surface thereof;
   a plurality of coil segments received by the slots;
   a plurality of first coil end plates electrically connected with the coil segments on either one of end surfaces of the stator core; and
   a plurality of second coil end plates electrically connected with the coil segments on the other end surface of the stator core,
   wherein each of the coil segments comprises connecting end portions protruding respectively from the one and the other end surfaces of the stator core,
   wherein each of the first coil end plates comprises:
   a plate portion in a flat plate shape extended along a circumferential direction of the stator core; and
   a pair of extended portions respectively extended along a radial direction of the stator core from one end side of the plate portion such that the connecting end portions of the corresponding coil segments are connected to the pair of extended portions,
   wherein the plurality of first coil end plates and the plurality of second coil end plates are disposed being laminated on the corresponding end surfaces of the stator core,
   wherein the plate portion of at least one of the plurality of first coil end plates is formed longer along the circumferential direction of the stator core than the plate portions of the other first coil end plates and has a stepped portion, and
   wherein the plate portion having the stepped portion is disposed such that an end portion thereof extending from the stepped portion overlaps with the first coil end late that forms a neighboring coil turn in an axial direction of the stator core, the end portion and the extended portion extending from the end portion intersect the first coil end plate that forms the neighboring coil turn in the axial direction of the stator core.

2. The stator according to claim 1,
   wherein the coil segments are received by respective two of the slots of the stator core and the connecting end portions of these coil segments are connected with a first coil end plate on the one end surface of the stator core and connected with a second coil end plate on the other end surface of the stator core to form a coil turn being an annular current path,
   and wherein a plurality of coil turns are formed along the circumferential direction of the stator core, corresponding to a number of combinations of coil segments received in two different slots of the stator core, the corresponding first coil end plate, and the corresponding second coil end plate to form a lap-wound coil loop.

3. The stator according to claim 1,
   wherein the at least one first coil end plate having the stepped portion is disposed on an uppermost layer of the plurality of first coil end plates laminated on the one end surface of the stator core.

4. The stator according to claim 1,
   wherein an elastic member is arranged between the plurality of first coil end plates disposed in lamination in an axial direction of the stator core on the one end surface of the stator core.

5. The stator according to claim 1,
   wherein virtual extension lines along respective longitudinal directions of the paired extended portions intersect with each other on an inner diameter side of the stator core.

6. The stator according to claim 1, wherein the plate portion having the step portion extends to have the same distance from the axis of the stator at the stop portion and a part other than the step portion.

7. The stator according to claim 1, wherein the plate portion having the step portion faces in an axial direction of the stator core at least two other plate portions which are not connected to the plate portion.

8. The stator according the claim 6, wherein the plate portion having the step portion faces in an axial direction of the stator core at least two other plate portions which are not connected to the plate portion.

* * * * *